(12) United States Patent
Takaki et al.

(10) Patent No.: US 9,625,249 B2
(45) Date of Patent: Apr. 18, 2017

(54) ROTATION ANGLE DETECTION DEVICE AND ELECTRIC POWER STEERING SYSTEM INCLUDING THE SAME

(71) Applicant: JTEKT CORPORATION, Osaka-shi, Osaka (JP)

(72) Inventors: Takeshi Takaki, Shiki-gun (JP); Yuji Kariatsumari, Kitakatsuragi-gun (JP); Yoshinobu Shimizu, Sakai (JP)

(73) Assignee: JTEKT CORPORATION, Osaka (JP)

( * ) Notice: Subject to any disclaimer, the term of this patent is extended or adjusted under 35 U.S.C. 154(b) by 151 days.

(21) Appl. No.: 14/104,510

(22) Filed: Dec. 12, 2013

(65) Prior Publication Data

US 2014/0158455 A1 Jun. 12, 2014

(30) Foreign Application Priority Data

Dec. 12, 2012 (JP) ................. 2012-271638

(51) Int. Cl.
*B62D 5/04* (2006.01)
*B62D 6/10* (2006.01)
(Continued)

(52) U.S. Cl.
CPC .............. *G01B 7/30* (2013.01); *B62D 5/0463* (2013.01); *B62D 6/10* (2013.01); *G01D 5/244* (2013.01)

(58) Field of Classification Search
CPC ...... B62D 5/046; B62D 5/049; B62D 5/0463; B62D 5/0484; B62D 15/0235; B62D 6/00; B62D 5/0466; B62D 6/10
See application file for complete search history.

(56) References Cited

U.S. PATENT DOCUMENTS 7,119,532 B2  10/2006  Nihei et al.
7,218,100 B1   5/2007  Matsumoto et al.
(Continued)

FOREIGN PATENT DOCUMENTS

EP  1018466 A2  7/2000
EP  1108987 A1  6/2001
(Continued)

OTHER PUBLICATIONS

Apr. 29, 2014 Extended European Search Report issued in European Patent Application No. 13196422.3.
(Continued)

*Primary Examiner* — Joseph Rocca
*Assistant Examiner* — Daniel Yeagley
(74) *Attorney, Agent, or Firm* — Oliff PLC

(57) ABSTRACT

Rotation angle computation modes include a normal mode and a simple mode. In normal mode, a rotation angle of an input shaft is computed based on output signals from first and second magnetic sensors, which are sampled at two sampling timings. In simple mode, the rotation angle of the input shaft is computed based on the output signals from the first and second magnetic sensors, which are sampled at one sampling timing, and an amplitude ratio between the output signals from the magnetic sensors set in advance. After a power supply is turned on, the rotation angle is computed in the simple mode until a condition that the rotation angle of the input shaft can be computed in the normal mode even if the immediately preceding value of the rotation angle of the input shaft is not present is satisfied. Then, the rotation angle is computed in the normal mode.

9 Claims, 14 Drawing Sheets

(51) Int. Cl.
  *G01B 7/30* (2006.01)
  *G01D 5/244* (2006.01)

(56) References Cited

U.S. PATENT DOCUMENTS

| | | | |
|---|---|---|---|
| 7,659,713 B2 | 2/2010 | Nakata et al. | |
| 7,969,147 B2 | 6/2011 | Hatanaka et al. | |
| 2002/0111763 A1 | 8/2002 | Koga | |
| 2002/0124663 A1* | 9/2002 | Tokumoto | B62D 6/10 73/862.333 |
| 2003/0042894 A1 | 3/2003 | Waffenschmidt | |
| 2003/0164261 A1* | 9/2003 | Takahashi | B62D 15/0245 180/443 |
| 2004/0083823 A1* | 5/2004 | Tokumoto | B62D 6/10 73/862.333 |
| 2004/0098219 A1* | 5/2004 | Tokumoto | B62D 6/10 702/151 |
| 2004/0210366 A1* | 10/2004 | Tomita | 701/41 |
| 2005/0052348 A1 | 3/2005 | Yamazaki et al. | |
| 2005/0150712 A1* | 7/2005 | Tokumoto | 180/443 |
| 2005/0242765 A1* | 11/2005 | Ta | B62D 5/046 318/799 |
| 2007/0107977 A1* | 5/2007 | Shibata | B62D 5/008 180/444 |
| 2008/0035411 A1* | 2/2008 | Yamashita et al. | 180/443 |
| 2008/0047775 A1* | 2/2008 | Yamazaki | 180/443 |
| 2008/0052562 A1 | 2/2008 | Kameya et al. | |
| 2008/0167780 A1* | 7/2008 | Suzuki | B62D 5/0466 701/42 |
| 2009/0105909 A1* | 4/2009 | Yamaguchi | 701/41 |
| 2009/0190283 A1 | 7/2009 | Hammerschmidt et al. | |
| 2009/0206827 A1 | 8/2009 | Aimuta et al. | |
| 2009/0230968 A1 | 9/2009 | Bittar et al. | |
| 2009/0240389 A1* | 9/2009 | Nomura et al. | 701/29 |
| 2010/0045227 A1 | 2/2010 | Ura et al. | |
| 2011/0022271 A1* | 1/2011 | Ueda et al. | 701/41 |
| 2011/0181292 A1* | 7/2011 | Oowada | G01R 35/00 324/537 |
| 2012/0031697 A1 | 2/2012 | Matsuda | |
| 2012/0109562 A1* | 5/2012 | Yabuguchi | G01D 5/2046 702/87 |
| 2012/0143563 A1* | 6/2012 | Ueda | G01D 5/24476 702/151 |
| 2012/0158340 A1 | 6/2012 | Ueda | |
| 2012/0158341 A1 | 6/2012 | Ueda et al. | |
| 2012/0182008 A1 | 7/2012 | Ueda et al. | |
| 2012/0182009 A1 | 7/2012 | Ueda | |
| 2012/0273290 A1* | 11/2012 | Kawano et al. | 180/443 |
| 2012/0274260 A1* | 11/2012 | Takahashi | H02P 29/0243 318/490 |
| 2012/0319680 A1 | 12/2012 | Ueda et al. | |
| 2013/0035896 A1 | 2/2013 | Ueda et al. | |

FOREIGN PATENT DOCUMENTS

| | | |
|---|---|---|
| EP | 1 684 051 A1 | 7/2006 |
| EP | 2 466 268 A2 | 6/2012 |
| EP | 2 477 004 A1 | 7/2012 |
| JP | 2002-213944 A | 7/2002 |
| JP | 2006-078392 A | 3/2006 |
| JP | 2007-139739 A | 6/2007 |
| JP | A-2008-026297 | 2/2008 |
| JP | 2008-241411 A | 10/2008 |
| JP | 2008-286709 A | 11/2008 |
| JP | 2010-048760 A | 3/2010 |
| JP | 2010-110147 A | 5/2010 |

OTHER PUBLICATIONS

May 9, 2014 Extended European Search Report issued in European Patent Application No. 13196425.8.
Apr. 29, 2014 Extended European Search Report issued in European Patent Application No. 13196421.5.
Apr. 29, 2014 Extended European Search Report issued in European Patent Application No. 13196424.9.
Apr. 29, 2014 Extended European Search Report issued in European Patent Application No. 13196423.1.
U.S. Appl. No. 14/104,408 to Takaki et al. filed Dec. 12, 2013.
U.S. Appl. No. 14/104,647 to Takaki et al. filed Dec. 12, 2013.
U.S. Appl. No. 14/104,500 to Takaki et al. filed Dec. 12, 2013.
U.S. Appl. No. 14/104,322 to Kariatsumari et al. filed Dec. 12, 2013.
Aug. 27, 2015 Office Action issued in U.S. Appl. No. 14/104,408.
Mar. 4, 2016 Office Action issued in U.S. Appl. No. 14/104,408.
Apr. 4, 2014 Extended European Search Report issued in European Patent Application No. 11193347.9.
Jul. 3, 2014 Notice of Reasons for Rejection Issued in Japanese Patent Application No. 2010-279440.
U.S. Pat. No. 9,121,729 to UEDA issued on Sep. 1, 2015.
Apr. 22, 2016 Office Action issued in U.S. Appl. No. 14/104,322.
Jul. 15, 2016 Office Action issued in U.S. Appl. No. 14/104,647.
Jun. 10, 2016 Office Action issued in U.S. Appl. No. 14/104,647.
Jul. 6, 2016 Office Action issued in U.S. Appl. No. 14/104,500.

* cited by examiner

ROTATION ANGLE DETECTION DEVICE AND ELECTRIC POWER STEERING SYSTEM INCLUDING THE SAME

INCORPORATION BY REFERENCE

The disclosure of Japanese Patent Application No. 2012-271638 filed on Dec. 12, 2012 including the specification, drawings and abstract is incorporated herein by reference in its entirety.

BACKGROUND OF THE INVENTION

1. Field of the Invention

The invention relates to a rotation angle detection device that detects a rotation angle of a rotary body, and an electric power steering system including the rotation angle detection device.

2. Description of the Related Art

As a rotation angle detection device that detects a rotation angle of a rotary body, there has been known a rotation angle detection device that detects a rotation angle of a rotor of a brushless motor with the use of a detection rotor that rotates in accordance with the rotation of the brushless motor. Specifically, as illustrated in FIG. 15, a detection rotor 201 (hereinafter, referred to as "rotor 201") includes a cylindrical magnet 202 having a plurality of magnetic pole pairs corresponding to magnetic pole pairs formed in a rotor of a brushless motor. Two magnetic sensors 221, 222 are arranged around the rotor 201 at a predetermined angular interval around the rotation central axis of the rotor 201. The magnetic sensors 221, 222 respectively output sinusoidal signals having a predetermined phase difference. On the basis of the two sinusoidal signals, a rotation angle of the rotor 201 (a rotation angle of the brushless motor) is detected.

In this example, the magnet 202 has five magnetic pole pairs. That is, the magnet 202 has ten magnetic poles arranged at equal angular intervals. The magnetic poles are arranged at angular intervals of 36° (180° in electrical angle) around the rotation central axis of the rotor 201. Further, the two magnetic sensors 221, 222 are arranged at an angular interval of 18° (90° in electrical angle) around the rotation central axis of the rotor 201.

The direction indicated by an arrow in FIG. 15 is defined as the forward rotation direction of the detection rotor 201. The rotation angle of the rotor 201 increases as the rotor 201 is rotated in the forward direction, whereas the rotation angle of the rotor 201 decreases as the rotor 201 is rotated in the reverse direction. The magnetic sensors 221, 222 output sinusoidal signals $S_1$, $S_2$, respectively. As illustrated in FIG. 16, one period of each of the sinusoidal signals $S_1$, $S_2$ corresponds to a duration in which the rotor 201 rotates an angle of 72° (360° in electrical angle) corresponding to one magnetic pole pair.

The angular range corresponding to one rotation of the rotor 201 is divided into five sections corresponding to the five magnetic pole pairs, a start position of each section is defined as 0°, and an end position of each section is defined as 360°. A rotation angle of the rotor 201 expressed under the above-described conditions is an electrical angle $\theta$ of the rotor 201. In this case, the first magnetic sensor 221 outputs an output signal of $S_1 = A_1 \cdot \sin\theta$, and the second magnetic sensor 222 outputs an output signal of $S_2 = A_2 \cdot \cos\theta$.

Each of $A_1$ and $A_2$ represents an amplitude. If the amplitude $A_1$ of the output signal $S_1$ and the amplitude $A_2$ of the output signal $S_2$ are assumed to be equal to each other, the electrical angle $\theta$ of the rotor 201 is obtained with the use of both the output signals $S_1$, $S_2$ based on the following expression.

$$\theta = \tan^{-1}(\sin\theta/\cos\theta)$$
$$= \tan^{-1}(S_1/S_2)$$

The thus obtained electrical angle $\theta$ is used to control the brushless motor. Refer to, for example, Japanese Patent Application Publication No. 2008-26297 (JP 2008-26297 A).

In the above-described conventional rotation angle detection device, the rotation angle $\theta$ is computed on the assumption that the amplitudes $A_1$, $A_2$ of the output signals $S_1$, $S_2$ output from the magnetic sensors 221, 222 are equal to each other. However, the amplitudes $A_1$, $A_2$ of the output signals $S_1$, $S_2$ vary depending on variations of the temperature characteristics of the magnetic sensors 221, 222 and temperature changes. Therefore, an error may be caused in detection of a rotation angle of the rotor due to variations of the temperature characteristics of the magnetic sensors 221, 222 and temperature changes.

SUMMARY OF THE INVENTION

One object of the invention is to provide a rotation angle detection device that is able to detect a rotation angle with a high degree of accuracy, and an electric power steering system including the rotation angle detection device.

A rotation angle detection device according to an aspect of the invention includes: a plurality of sensors used to detect a rotation angle of a rotary body; a sampling unit that samples an output signal from each of the sensors at prescribed timing; a first computation unit that computes the rotation angle of the rotary body with use of a plurality the output signals from at least two sensors among the plurality of the sensors, the output signals being sampled at a prescribed number of different timings, the prescribed number being two or more; a second computation unit that computes the rotation angle of the rotary body in a simple manner with use of the output signals from two sensors among the plurality of the sensors, the output signals being sampled at one sampling timing; and a selector that selects one of the first computation unit and the second computation unit, as a computation unit used to compute the rotation angle of the rotary body, based on the output signals from the sensors that are sampled by the sampling unit.

In one aspect of the invention, a rotation angle detection device includes: a plurality of sensors (71, 72; 74, 75) used to detect a rotation angle of a rotary body (8; 9); a sampling unit (77A; 77B) that samples an output signal from each of the sensors at prescribed timing; a first computation unit (77A, S7, S7A, S16, S16A; 77B) that computes the rotation angle of the rotary body with use of a plurality the output signals from at least two sensors among the plurality of the sensors, the output signals being sampled at a prescribed number of different timings, the prescribed number being two or more; a second computation unit (77A, S5, S14; 77B) that computes the rotation angle of the rotary body in a simple manner with use of the output signals from two sensors among the plurality of the sensors, the output signals being sampled at one sampling timing; and a selector (77A, S3, S4, S4A; S12; 77B) that selects one of the first computation unit and the second computation unit, as a computation unit used to compute the rotation angle of the rotary body, based on the output signals from the sensors that are sampled by the sampling unit. The references numbers indicate the corresponding elements in the embodiment. However, of course, the scope of the claim would not be limited to this embodiment.

In the rotation angle detection device according to the above-described aspect, the rotation angle of the rotary body is computed by the computation unit selected by the selector among the first computation unit and the second computation unit. The first computation unit computes the rotation angle of the rotary body with use of a plurality the output signals from at least two sensors among the plurality of the sensors, the output signals being sampled at a prescribed number of different timings, the prescribed number being two or more. Therefore, when the rotation angle is computed by the first computation unit, it is possible to compute the rotation angle with a higher degree of accuracy than that in the above-described conventional technique.

An electric power steering system according to another aspect of the invention includes: a steering shaft including an input shaft, an output shaft, and a torsion bar that connects the input shaft and the output shaft to each other; an electric motor used to generate steering assist force; a first rotation angle detection device that is formed of the rotation angle detection device according to the above-described aspect, and is configured to detect a rotation angle of the input shaft as a first rotation angle; a second rotation angle detection device that is formed of the rotation angle detection device according to the above-described aspect, and is configured to detect a rotation angle of the output shaft as a second rotation angle; a steering torque computation unit that computes a steering torque that is supplied to the input shaft, based on the first rotation angle detected by the first rotation angle detection device and the second rotation angle detected by the second rotation angle detection device; and a current command value setting unit that sets a current command value that serves as a target value of a current to be passed through the electric motor, with use of the steering torque computed by the steering torque computation unit. The current command value setting unit includes a dead zone setting unit that sets the current command value to zero when at least one of the first rotation angle and the second rotation angle used to compute the steering torque is computed by the second computation unit and an absolute value of the steering torque is equal to or smaller than a prescribed value.

In one aspect of the invention, an electric power steering system includes: a steering shaft including an input shaft (8), an output shaft (9), and a torsion bar (10) that connects the input shaft and the output shaft to each other; an electric motor (18) used to generate steering assist force; a first rotation angle detection device (61, 71, 72, 77A) that is formed of the rotation angle detection device according to the above-described aspect, and is configured to detect a rotation angle of the input shaft as a first rotation angle; a second rotation angle detection device (62, 74, 75, 77B) that is formed of the rotation angle detection device according to the above-described aspect, and is configured to detect a rotation angle of the output shaft as a second rotation angle; a steering torque computation unit (77C) that computes a steering torque that is supplied to the input shaft, based on the first rotation angle detected by the first rotation angle detection device and the second rotation angle detected by the second rotation angle detection device; and a current command value setting unit (41) that sets a current command value that serves as a target value of a current to be passed through the electric motor, with use of the steering torque computed by the steering torque computation unit. The current command value setting unit includes a dead zone setting unit that sets the current command value to zero when at least one of the first rotation angle and the second rotation angle used to compute the steering torque is computed by the second computation unit and an absolute value of the steering torque is equal to or smaller than a prescribed value. The references numbers indicate the corresponding elements in the embodiment. However, of course, the scope of the claim would not be limited to this embodiment.

According to the above-described aspect, even if an error is produced in the steering torque computed by the steering torque computation unit, by computing at least one of the rotation angle of the input shaft and the rotation angle of the output shaft in the simple mode, it is possible to prevent the steering assist torque in a direction opposite to the direction of the steering assist torque that should be generated, from being generated by the electric motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
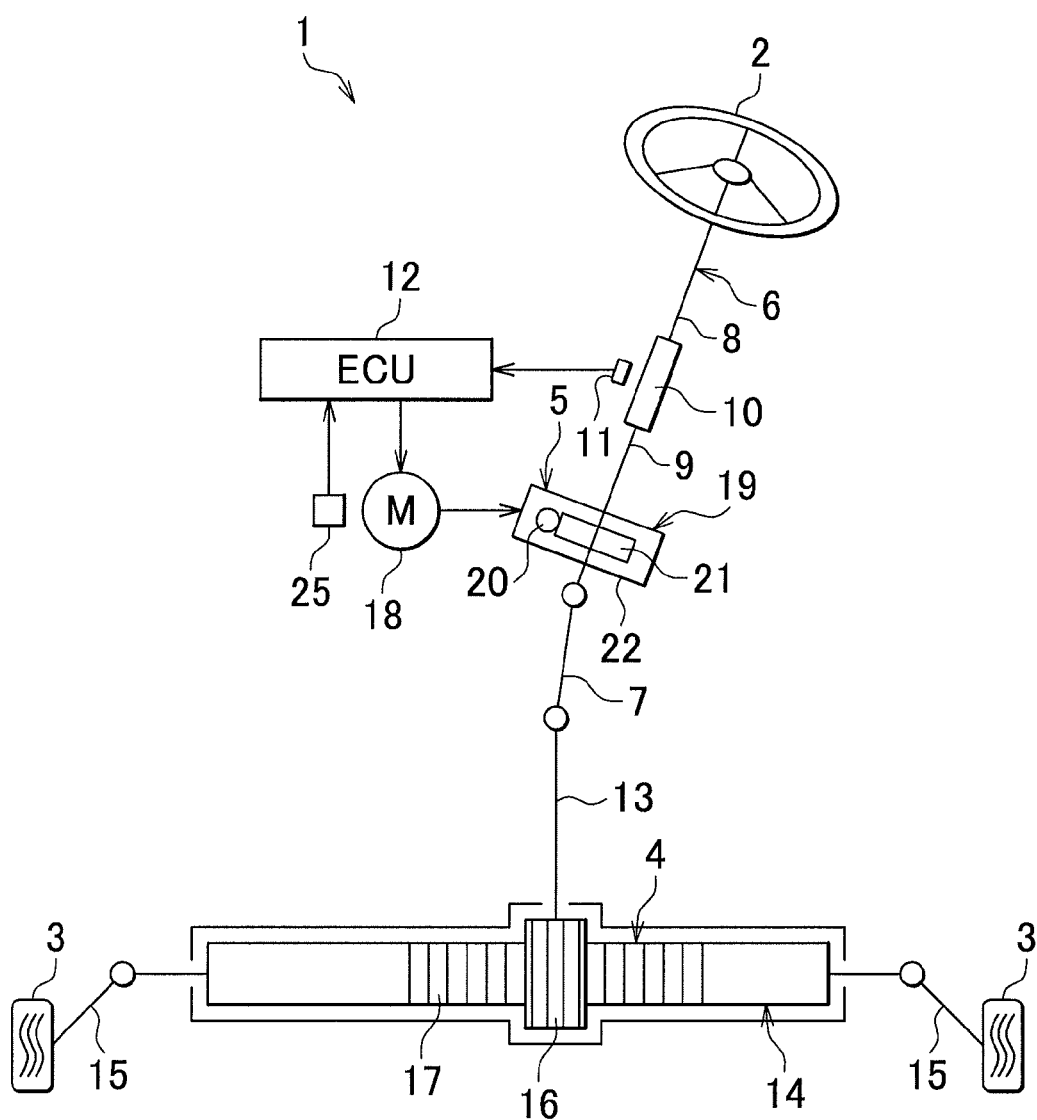
FIG. 1 is a schematic view illustrating the schematic configuration of an electric power steering system to which a rotation angle detection device according to an embodiment of the invention is applied.

Hereinafter, embodiments of the invention will be described with reference to the accompanying drawings. As illustrated in FIG. 1, an electric power steering system 1 includes a steering wheel 2, which serves as a steering member used to steer a vehicle, a steered mechanism 4 that steers steered wheels 3 in accordance with the rotation of the steering wheel 2, and a steering assist mechanism 5 used to assist a driver in performing a steering operation. The steering wheel 2 and the steered mechanism 4 are mechanically connected to each other via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected to each other via a torsion bar 10 so as to be rotatable relative to each other on the same axis. That is, when the steering wheel 2 is rotated, the input shaft 8 and the output shaft 9 rotate in the same direction while rotating relative to each other.

A torque sensor (torque detection device) 11, to which a rotation angle detection device according to an embodiment of the invention is applied, is arranged around the steering shaft 6. The torque sensor 11 detects a steering torque applied to the steering wheel 2 on the basis of a relative rotational displacement between the input shaft 8 and the output shaft 9. The steering torque detected by the torque sensor 11 is input into an electronic control unit 12 for motor control (hereinafter, referred to as "motor control ECU 12").

The steered mechanism 4 is formed of a rack-and-pinion mechanism including a pinion shaft 13 and a rack shaft 14 that serves as a steered shaft. The steered wheels 3 are connected to respective end portions of the rack shaft 14 via tie rods 15 and knuckle arms (not illustrated). The pinion shaft 13 is connected to the intermediate shaft 7. The pinion shaft 13 rotates in accordance with steering of the steering wheel 2. A pinion 16 is connected to a distal end of the pinion shaft 13.

The rack shaft 14 linearly extends along the lateral direction of the vehicle (the direction orthogonal to the direction in which the vehicle travels straight ahead). A rack 17 that meshes with the pinion 16 is formed at an axially intermediate portion of the rack shaft 14. The pinion 16 and the rack 17 convert the rotation of the pinion shaft 13 into an axial movement of the rack shaft 14. By moving the rack shaft 14 in the axial direction, the steered wheels 3 are steered.

When the steering wheel 2 is steered (rotated), the rotation is transmitted to the pinion shaft 13 via the steering shaft 6 and the intermediate shaft 7. The rotation of the pinion shaft 13 is converted into an axial movement of the rack shaft 14 by the pinion 16 and the rack 17. As a result, the steered wheels 3 are steered. The steering assist mechanism 5 includes an electric motor 18 that generates steering assist force and a speed-reduction mechanism 19 that transmits torque output from the electric motor 18 to the steered mechanism 4. The electric motor 18 is formed of a three-phase brushless motor in the present embodiment. The speed-reduction mechanism 19 is formed of a worm gear mechanism including a worm shaft 20 and a worm wheel 21 that meshes with the worm shaft 20. The speed-reduction mechanism 19 is housed in a gear housing 22 that serves as a transmission mechanism housing.

The worm shaft 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm shaft 20. When the worm shaft 20 is driven to be rotated by the electric motor 18, the worm wheel 21 is driven to be rotated, and the steering shaft 6 rotates. The rotation of the steering shaft 6 is transmitted to the pinion shaft 13 via the intermediate shaft 7. The rotation of the pinion shaft 13 is converted into an axial movement of the rack shaft 14. As a result, the steered wheels 3 are steered. That is, when the worm shaft 20 is driven to be rotated by the electric motor 18, the steered wheels 3 are steered.

Figure 2:
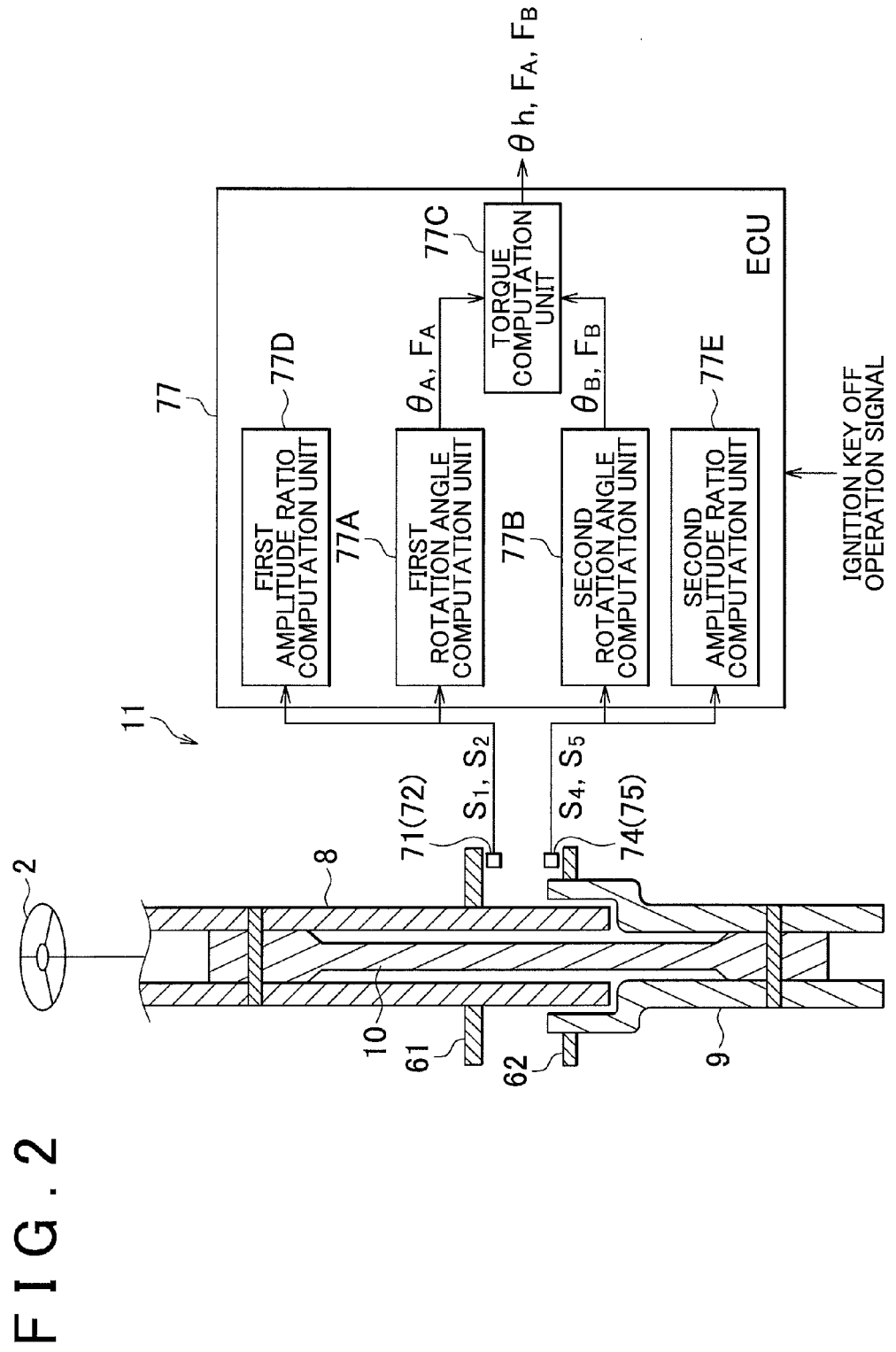
FIG. 2 is a schematic view schematically illustrating the configuration of a torque sensor.

A rotation angle of a rotor of the electric motor 18 (a rotor rotation angle) is detected by a rotation angle sensor 25 such as a resolver. A signal output from the rotation angle sensor 25 is input into the motor control ECU 12. The electric motor 18 is controlled by the motor control ECU 12 that serves as a motor control unit. FIG. 2 is a schematic view schematically illustrating the configuration of the torque sensor 11.

An annular first magnet (a multipolar magnet) 61 is connected to the input shaft 8 so as to be rotatable together with the input shaft 8. Two magnetic sensors 71, 72 that respectively output sinusoidal signals having a phase difference in accordance with the rotation of the first magnet 61 are arranged below the first magnet 61. An annular second magnet (a multipolar magnet) 62 is connected to the output shaft 9 so as to be rotatable together with the output shaft 9. Two magnetic sensors 74, 75 that respectively output sinusoidal signals having a phase difference in accordance with the rotation of the second magnet 62 are arranged above the second magnet 62.

The output signals $S_1$, $S_2$, $S_4$, $S_5$ from the respective magnetic sensors 71, 72, 74, 75 are input into a torque computation ECU 77 used to compute a steering torque that is applied to the input shaft 8. A power supply for the torque computation ECU 77 is turned on when an ignition key is turned on. When the ignition key is turned off, an ignition key off operation signal indicating that the ignition key is turned off is input into the torque computation ECU 77. A magnetic sensor including an element having electrical characteristics that vary due to the action of a magnetic force, for example, a Hall element or a magnetoresistive element (a MR element) may be used as each of the magnetic sensors. In the present embodiment, a Hall element is used as each of the magnetic sensors.

The magnets 61, 62, the magnetic sensors 71, 72, 74, 75, and the torque computation ECU 77 constitute the torque sensor 11. The torque computation ECU 77 includes a microcomputer. The microcomputer is provided with a CPU and memories (a ROM, a RAM, a nonvolatile memory, etc.), and functions as a plurality of functional processing units by executing predetermined programs. The functional processing units include a first rotation angle computation unit 77A, a second rotation angle computation unit 77B, a torque computation unit 77C, a first amplitude ratio computation unit 77D, and a second amplitude ratio computation unit 77E.

When the operation mode of the torque computation ECU 77 is set to an amplitude ratio computation mode by an operator or the like, the first amplitude ratio computation unit 77D detects an amplitude ratio between the output signals $S_1$, $S_2$ from the two magnetic sensors 71, 72 on the basis of the output signals $S_1$, $S_2$, and stores the detected amplitude ratio in a nonvolatile memory. When the operation mode of the torque computation ECU 77 is set to the amplitude ratio computation mode by the operator or the like, the second amplitude ratio computation unit 77E detects an amplitude ratio between the output signals $S_4$, $S_5$ from the two magnetic sensors 74, 75 on the basis of the output signals $S_4$, $S_5$, and stores the detected amplitude ratio in the nonvolatile memory. For example, before shipment of the electric power steering system 1, the operation mode of the torque computation ECU 77 is set to the amplitude ratio computation mode. Details of the operations of the first amplitude ratio computation unit 77D and the second amplitude ratio computation unit 77E will be described later.

The first rotation angle computation unit 77A computes a rotation angle (electrical angle $\theta_A$) of the input shaft 8 on the basis of the output signals $S_1$, $S_2$ from the two magnetic sensors 71, 72 and the amplitude ratio between the output signals $S_1$, $S_2$ stored in the nonvolatile memory. The second rotation angle computation unit 77B computes a rotation angle (electrical angle $\theta_B$) of the output shaft 9 on the basis of the output signals $S_4$, $S_5$ from the two magnetic sensors 74, 75 and the amplitude ratio between the output signals $S_4$, $S_5$ stored in the nonvolatile memory.

The torque computation unit 77C computes the steering torque Th applied to the input shaft 8 on the basis of the rotation angle $\theta_A$ of the input shaft 8 detected by the first rotation angle computation unit 77A and the rotation angle $\theta_B$ of the output shaft 9 detected by the second rotation angle computation unit 77B. Specifically, the steering torque Th is computed according to the following expression (1) where K is a spring constant of the torsion bar 10 and N is the number of magnetic pole pairs formed in each of the magnets 61, 62.

$$Th=\{(\theta_A-\theta_B)/N\}\times K \quad (1)$$

The first magnet 61, the magnetic sensors 71, 72, and the first rotation angle computation unit 77A constitute a first rotation angle detection device used to detect the rotation angle $\theta_A$ of the input shaft 8. The second magnet 62, the magnetic sensors 74, 75, and the second rotation angle computation unit 77B constitute a second rotation angle detection device used to detect the rotation angle $\theta_B$ of the output shaft 9. Because an operation of the first rotation angle detection device (the first rotation angle computation unit 77A) is the same as an operation of the second rotation angle detection device (the second rotation angle computation unit 77B), only the operation of the first rotation angle detection device (the first rotation computation unit 77A) will be described below.

Figure 3:
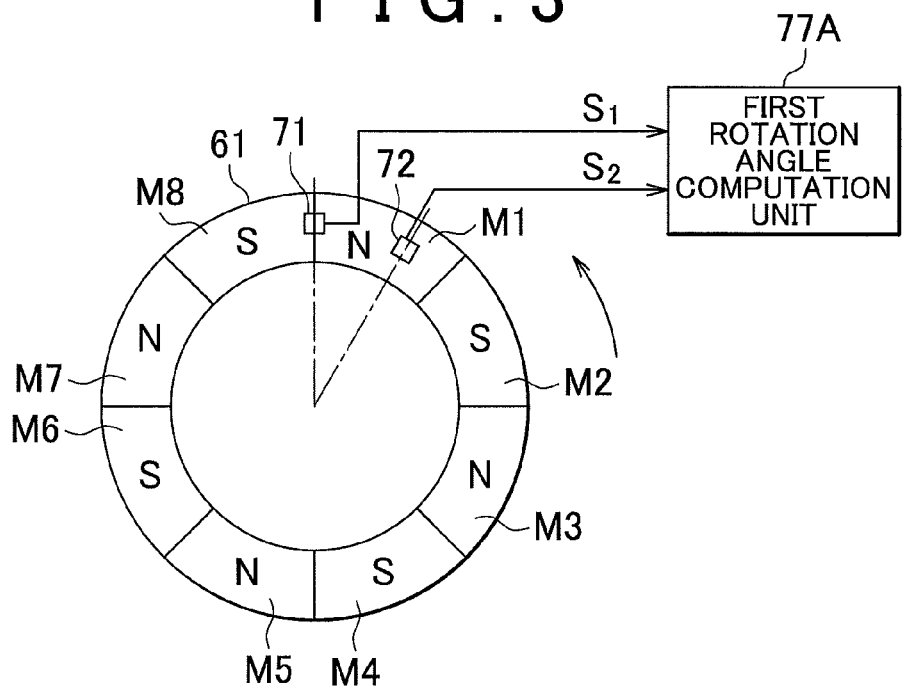
FIG. 3 is a schematic diagram illustrating the configuration of a first magnet and the arrangement of two magnetic sensors.

FIG. 3 is a schematic diagram illustrating the configuration of the first magnet 61 and the arrangement of the two magnetic sensors 71, 72. The first magnet 61 has four magnetic pole pairs (M1, M2), (M3, M4), (M5, M6), (M7, M8) arranged at equal angular intervals in the circumferential direction. That is, the first magnet 61 has the eight magnetic poles M1 to M8 arranged at the equal angular intervals. The magnetic poles M1 to M8 are arranged at angular intervals of approximately 45° (approximately 180° in electrical angle) around the central axis of the input shaft 8. The magnitudes of magnetic forces of the magnetic poles M1 to M8 are substantially equal to each other.

Figure 4:
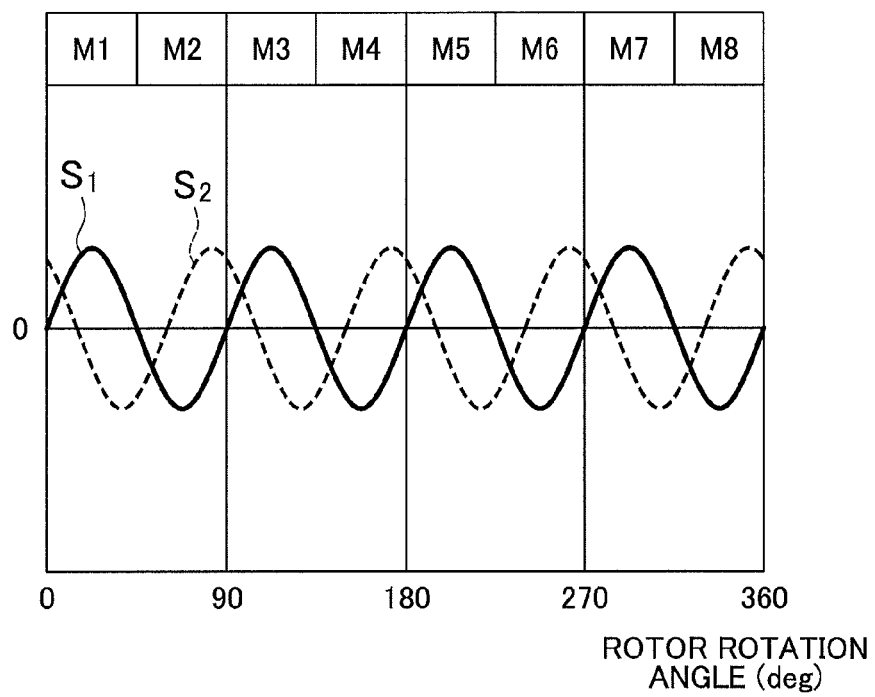
FIG. 4 is a schematic diagram illustrating waveforms of output signals from a first magnetic sensor and a second magnetic sensor.

The two magnetic sensors 71, 72 are arranged so as to face a lower annular end face of the first magnet 61. The magnetic sensors 71, 72 are arranged at an angular interval of 120° in electrical angle around the central axis of the input shaft 8. In the following description, the magnetic sensor 71 will be referred to as a first magnetic sensor 71 and the magnetic sensor 72 will be referred to as a second magnetic sensor 72 where appropriate. The direction indicated by an arrow in FIG. 3 is defined as the forward rotation direction of the input shaft 8. The rotation angle of the input shaft 8 increases as the input shaft 8 is rotated in the forward direction, and the rotation angle of the input shaft 8 decreases as the input shaft 8 is rotated in the reverse direction. Sinusoidal signals $S_1$, $S_2$ are respectively output from the magnetic sensors 71, 72 in accordance with rotation of the input shaft 8, as illustrated in FIG. 4. Note that a rotation angle (deg) on the abscissa axis in FIG. 4 represents a mechanical angle.

In the following description, the output signal $S_1$ from the first magnetic sensor 71 will be referred to as a first output signal $S_1$ or a first sensor value $S_1$, and the output signal $S_2$ from the second magnetic sensor 72 will be referred to as a second output signal $S_2$ or a second sensor value $S_2$ where appropriate. In the following description, a rotation angle of the input shaft 8 will be denoted by $\theta$ instead of $\theta_A$, for convenience of explanation. If each of the output signals $S_1$, $S_2$ is a sinusoidal signal and a rotation angle of the input shaft 8 is $\theta$ (electrical angle), the output signal $S_1$ from the first magnetic sensor 71 is expressed by $S_1=A_1\cdot\sin\theta$, and the output signal $S_2$ from the second magnetic sensor 72 is expressed by $S_2=A_2\sin(\theta+120)$. Each of $A_1$ and $A_2$ represents an amplitude. The phase difference between the first output signal $S_1$ and the second output signal $S_2$ is 120°.

The modes of computation of the rotation angle $\theta$ executed by the first rotation angle computation unit 77A include a normal mode and a simple mode. First, a basic concept of the rotation angle computing method in the normal mode will be described. The rotation angle computing method in the normal mode includes two kinds of methods. The first method is a method of computing the rotation angle $\theta$ on the basis of the output signals from the two magnetic sensors 71, 72, which are sampled at two sampling timings (hereinafter, referred to as "first computing method"). The second method is a method of computing the rotation angle $\theta$ on the basis of the output signals from the two magnetic sensors 71, 72, which are sampled at three sampling timings (hereinafter, referred to as "second computing method").

A basic concept of the first computing method will be described. A phase difference (electrical angle) between the first output signal $S_1$ and the second output signal $S_2$ will be denoted by C. The number of a present sampling period (the number of a present computation period) will be denoted by (n) and the number of an immediately preceding sampling period (the number of an immediately preceding computation period) will be denoted by (n−1). With the use of the phase difference C and the numbers (n), (n−1) of the sampling periods, the first output signal $S_1$ sampled in the present sampling period, the first output signal $S_1$ sampled in the immediately preceding sampling period, the second output signal $S_2$ sampled in the present sampling period, and the second output signal $S_2$ sampled in the immediately preceding sampling period are expressed by the following expressions (2a), (2b), (2c), (2d), respectively.

$$S_1(n)=A_1(n)\sin\theta(n) \quad (2a)$$

$$S_1(n-1)=A_1(n-1)\sin\theta(n-1) \quad (2b)$$

$$S_2(n)=A_2(n)\sin(\theta(n)+C) \quad (2c)$$

$$S_2(n-1)=A_2(n-1)\sin(\theta(n-1)+C) \quad (2d)$$

If C is a known quantity, the number of unknown quantities ($A_1(n)$, $A_1(n-1)$, $A_2(n)$, $A_2(n-1)$, $\theta(n)$, $\theta(n-1)$) included in the four expressions is six. That is, because the number of the unknown quantities is greater than the number of the expressions, simultaneous equations constituted of the four expressions cannot be solved in this state.

Therefore, by setting a short sampling interval (sampling period), variations of amplitudes due to temperature changes between two sampling timings are assumed to be nonexistent. That is, on the assumption that amplitudes $A_1(n)$, $A_1(n-1)$ of the output signals from the first magnetic sensor 71 at two sampling timings are equal to each other, the amplitudes $A_1(n)$, $A_1(n-1)$ are expressed by $A_1$. Similarly, on the assumption that amplitudes $A_2(n)$, $A_2(n-1)$ of the output signals from the second magnetic sensor 72 at two sampling timings are equal to each other, the amplitudes $A_2(n)$, $A_2(n-1)$ are expressed by $A_2$. Thus, the expressions (2a), (2b), (2c), (2d) can be expressed by the following expressions (3a), (3b), (3c), (3d), respectively.

$$S_1(n)=A_1\sin\theta(n) \quad (3a)$$

$$S_1(n-1)=A_1\sin\theta(n-1) \quad (3b)$$

$$S_2(n)=A_2\sin(\theta(n)+C) \quad (3c)$$

$$S_2(n-1)=A_2\sin(\theta(n-1)+C) \quad (3d)$$

The number of unknown quantities ($A_1$, $A_2$, $\theta(n)$, $\theta(n-1)$) included in the four expressions is four. That is, because the number of the unknown quantities is equal to or smaller than the number of expressions, simultaneous equations constituted of the four expressions can be solved. Therefore, by solving the simultaneous equations constituted of the four expressions (3a), (3b), (3c), (3d), the rotation angle $\theta(n)$ of the input shaft 8 can be computed.

Hereinafter, the case where the phase difference C between the sinusoidal signals respectively output from the magnetic sensors 71, 72 is 120° will be described in detail. When the phase difference C is 120°, the four expressions (3a), (3b), (3c), (3d) can be expressed by the following expressions (4a), (4b), (4c), (4d), respectively.

$$S_1(n)=A_1\sin\theta(n) \quad (4a)$$

$$S_1(n-1)=A_1\sin\theta(n-1) \quad (4b)$$

$$S_2(n)=A_2\sin(\theta(n)+120) \quad (4c)$$

$$S_2(n-1)=A_2\sin(\theta(n-1)+120) \quad (4d)$$

By solving simultaneous equations constituted of the four expressions (4a), (4b), (4c), (4d), the rotation angle $\theta(n)$ of the input shaft 8 can be expressed by the following expression (5) (hereinafter, referred to as "basic arithmetic expression (5)").

$$\theta[n] = \frac{1}{4}\cos^{-1}\left(1 - \frac{(3p_1^2 p_2^2 - 2p_1^2 - 2p_2^2 + p_1 p_2)^2}{2(p_1 - p_2)^2(p_1^2 + p_1 p_2 + p_2^2)}\right) - \frac{1}{4}\cos^{-1}\left(\frac{1}{2} - \frac{3}{2} \cdot \frac{p_1 p_2 + p_2^2}{p_1^2 + p_1 p_2 + p_2^2}\right) \quad (5)$$

where $$p_1 = \frac{S_1[n]}{S_1[n-1]}$$

$$p_2 = \frac{S_2[n]}{S_2[n-1]}$$

Therefore, when the phase difference C between the sinusoidal signals respectively output from the magnetic sensors is 120°, the rotation angle $\theta(n)$ of the input shaft 8 can be computed with the use of four sensor values $S_1(n)$, $S_1(n-1)$, $S_2(n)$, $S_2(n-1)$ and the basic arithmetic expression (5). However, when at least one of the denominators of the fractions included in the basic arithmetic expression (5) is zero, the rotation angle $\theta(n)$ cannot be computed according to the basic arithmetic expression (5). Therefore, in the present embodiment, when at least one of the denominators of the fractions included in the basic arithmetic expression (5) is zero, the rotation angle $\theta(n)$ is computed according to an arithmetic expression different from the basic arithmetic expression (5). Further, in the present embodiment, if the rotation angle $\theta(n)$ can be computed according to an arithmetic expression that is simpler than the basic arithmetic expression (5) although the rotation angle $\theta(n)$ can be computed according to the basic arithmetic expression (5), the rotation angle $\theta(n)$ is computed according to the arithmetic expression that is simpler than the basic arithmetic expression (5). In the present embodiment, the case where the rotation angle $\theta(n)$ can be computed more easily than using the basic arithmetic expression (5) is the case where $S_2(n)=0$ or the case where $S_1(n)=0$.

In the present embodiment, as arithmetic expressions used to compute the rotation angle $\theta(n)$, ten kinds of arithmetic expressions including the basic arithmetic expression (5) are prepared.

Table 1 shows the ten kinds of arithmetic expressions and the conditions for the arithmetic expressions. Note that, at the time of computing the rotation angle $\theta(n)$, whether the conditions are satisfied is determined starting from the conditions on the top of Table 1. If it is determined that the conditions are satisfied, whether the subsequent conditions are satisfied is not determined. Then, the rotation angle $\theta(n)$ is computed according to the arithmetic expression corresponding to the conditions that are determined to be satisfied.

TABLE 1

| | CONDITIONS (AND) | ARITHMETIC EXPRESSIONS |
|---|---|---|
| 1 | $S_1[n] \neq 0$, $S_2[n-1] \neq 0$, $S_2[n] \neq 0$, $S_1[n-1] \neq 0$, $P_1 - P_2 \neq 0$ | BASIC ARITHMETIC EXPRESSION (EXPRESSION (5)) |
| 2 | $S_1[n] \neq 0$, $S_2[n-1] \neq 0$, $S_2[n] \neq 0$, $S_1[n-1] \neq 0$, $P_1 - P_2 = 0$ | $\theta[n] \leftarrow$ IMMEDIATELY PRECEDING VALUE |
| 3 | $S_1[n] \neq 0$, $S_2[n-1] \neq 0$, $S_2[n] \neq 0$, $S_1[n-1] = 0$, $S_2[n-1] > 0$ | $\theta[n] = \sin^{-1}\left(\frac{\sqrt{3}}{2} \cdot \frac{S_2[n]}{S_2[n-1]}\right) - 120$ |

TABLE 1-continued

| | CONDITIONS (AND) | ARITHMETIC EXPRESSIONS |
|---|---|---|
| 4 | $S_1[n] \neq 0$, $S_2[n-1] \neq 0$, $S_2[n] \neq 0$, $S_1[n-1] = 0$, $S_2[n-1] < 0$ | $\theta[n] = \sin^{-1}\left(-\frac{\sqrt{3}}{2} \cdot \frac{S_2[n]}{S_2[n-1]}\right) - 120$ |
| 5 | $S_1[n] \neq 0$, $S_2[n-1] \neq 0$, $S_2[n] = 0$, $S_1[n] > 0$ | $\theta[n] = 60$ |
| 6 | $S_1[n] \neq 0$, $S_2[n-1] \neq 0$, $S_2[n] = 0$, $S_1[n] < 0$ | $\theta[n] = -120$ |
| 7 | $S_1[n] \neq 0$, $S_2[n-1] = 0$, $S_1[n-1] > 0$ | $\theta[n] = \sin^{-1}\left(\frac{\sqrt{3}}{2} \cdot \frac{S_1[n]}{S_1[n-1]}\right)$ |
| 8 | $S_1[n] \neq 0$, $S_2[n-1] = 0$, $S_1[n-1] < 0$ | $\theta[n] = \sin^{-1}\left(-\frac{\sqrt{3}}{2} \cdot \frac{S_1[n]}{S_1[n-1]}\right)$ |
| 9 | $S_1[n] = 0$, $S_2[n] > 0$ | $\theta[n] = 0$ |
| 10 | $S_1[n] = 0$, $S_2[n] < 0$ | $\theta[n] = 180$ |

The first arithmetic expression from the top of Table 1 is the basic arithmetic expression (5). The basic arithmetic expression (5) is used when the condition that neither $S_1(n)$ nor $S_2(n)$ is zero and the condition that none of the denominators of the fractions included in the basic arithmetic expression (5) are zero are both satisfied. The condition that none of the denominators of the fractions included in the basic arithmetic expression (5) are zero is satisfied when $p_1-p_2\neq 0$, $p_1p_2+p_2^2\neq 0$, $S_1(n-1)\neq 0$, and $S_2(n-1)\neq 0$. Note that $S_1(n-1)$ is the denominator of $p_1$ and $S_2(n-1)$ is the denominator of $p_2$.

Note that, $p_1^2+p_1p_2+p_2^2=0$ is satisfied only when $p_1=p_2=0$. However, the phase of a sinusoidal signal output from the first magnetic sensor 71 is 120° different from the phase of a sinusoidal signal output from the second magnetic sensor 72, and hence the sensor values $S_1$, $S_2$ from both the magnetic sensors 71, 72 do not become zero at the same time. Therefore, $p_1^2+p_1p_2+p_2^2=0$ is not satisfied. Therefore, the condition that none of the denominators of the fractions included in the basic arithmetic expression (5) are zero is satisfied when all the conditions that $p_1-p_2\neq 0$, $S_1(n-1)\neq 0$, and $S_2(n-1)\neq 0$ are satisfied.

The second arithmetic expression from the top of Table 1 is an arithmetic expression that is used when $p_1-p_2=0$. The case where $p_1-p_2=0$ is satisfied will be considered blow. In this case, because $p_1=p_2$, the following expression (6) is satisfied.

$$\frac{A_1 \sin\theta[n]}{A_1 \sin\theta[n-1]} = \frac{A_2 \sin(\theta[n]+120)}{A_2 \sin(\theta[n-1]+120)} \tag{6}$$

When this expression is deformed, the following expression (7) can be obtained.

$$\frac{\sin\theta[n-1]}{\sin\theta[n]} \cdot \frac{\sin(\theta[n]+120)}{\sin(\theta[n-1]+120)} = 1 \tag{7}$$

The case where the expression (7) is satisfied is the case where $\theta(n)$ is equal to $\theta(n-1)$, that is, the case where the present rotation angle $\theta(n)$ is equal to the immediately preceding rotation angle $\theta(n-1)$. When the condition that neither $S_1(n)$ nor $S_2(n)$ is zero, the condition that neither the denominator $S_1(n-1)$ of $p_1$ nor the denominator $S_2(n-1)$ of $p_2$ is zero, and the condition that $p_1-p_2=0$ are all satisfied, the immediately preceding computed rotation angle $\theta(n-1)$ is used as the present rotation angle $\theta(n)$.

The third and fourth arithmetic expressions from the top of Table 1 are arithmetic expressions that are used when the denominator $S_1(n-1)$ of $p_1$ is zero. Because $S_1(n-1)=A_1 \sin \theta(n-1)$, $S_1(n-1)=0$ is satisfied when $\sin \theta(n-1)=0$. That is, when $\theta(n-1)$ is 0° or 180°, $S_1(n-1)$ is zero. Because $S_2(n-1)=A_2 \sin(\theta(n-1)+120)$, $S_2(n-1)>0$ is satisfied when $\theta(n-1)$ is 0°, and $S_2(n-1)<0$ is satisfied when $\theta(n-1)$ is 180°. Therefore, $\theta(n-1)=0$ is satisfied when $S_1(n-1)=0$ and $S_2(n-1)>0$, and $\theta(n-1)=180$ is satisfied when $S_1(n-1)=0$ and $S_2(n-1)<0$.

When $\theta(n-1)=0$, the expressions (4c), (4d) are expressed by the following expressions (8c), (8d), respectively.

$$S_2(n)=A_2 \sin(\theta(n)+120) \tag{8c}$$

$$S_2(n-1)=A_2 \sin 120=\sqrt{3}/2\cdot A_2 \tag{8d}$$

The following expression (9) can be obtained from the expression (8d).

$$A_2=(2/\sqrt{3})\cdot S_2(n-1) \tag{9}$$

When the expression (9) is substituted into the expression (8c), the following expression (10) can be obtained.

$$\sin(\theta(n)+120)=(\sqrt{3}/2)\cdot(S_2(n)/S_2(n-1)) \tag{10}$$

Therefore, the rotation angle $\theta(n)$ can be computed according to the following expression (11).

$$\theta[n] = \sin^{-1}\left(\frac{\sqrt{3}}{2} \cdot \frac{S_2[n]}{S_2[n-1]}\right) - 120 \tag{11}$$

As shown in the third row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)>0$ are all satisfied, the rotation angle $\theta(n)$ is computed according to the arithmetic expression expressed by the expression (11).

On the other hand, when $\theta(n-1)=180$, the expressions (4c), (4d) are expressed by the following expressions (12c), (12d), respectively.

$$S_2(n)=A_2 \sin(\theta(n)+120) \tag{12c}$$

$$S_2(n-1)=A_2 \sin 300=-\sqrt{3}/2\cdot A_2 \tag{12d}$$

The following expression (13) can be obtained from the expression (12d).

$$A_2=(-2/\sqrt{3})\cdot S_2(n-1) \tag{13}$$

When the expression (13) is substituted into the expression (12c), the following expression (14) can be obtained.

$$\sin(\theta(n)+120)=(-\sqrt{3}/2)\cdot(S_2(n)/S_2(n-1)) \tag{14}$$

The rotation angle $\theta(n)$ can be computed according to the following expression (15).

$$\theta[n] = \sin^{-1}\left(-\frac{\sqrt{3}}{2} \cdot \frac{S_2[n]}{S_2[n-1]}\right) - 120 \tag{15}$$

As shown in the fourth row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)<0$ are all satisfied, the rotation angle θ(n) is computed according to the arithmetic expression expressed by the expression (15). The fifth and sixth arithmetic expressions from the top of Table 1 are arithmetic expressions used when $S_2(n)=0$ is satisfied. Because $S_2(n)=A_2 \sin(\theta(n)+120)$, when $\sin(\theta(n)+120)=0$, $S_2(n)=0$ is satisfied. That is, when θ(n) is −120° or 60°, $S_2(n)=0$ is satisfied. Because $S_1(n)=A_1 \sin \theta(n)$, $S_1(n)<0$ is satisfied when θ(n) is −120°, and $S_1(n)>0$ is satisfied when θ(n)=60°. θ(n)=60 is satisfied when $S_2(n)=0$ and $S_1(n)>0$, and θ(n)=−120 is satisfied when $S_2(n)=0$ and $S_1(n)<0$.

As shown in the fifth row from the top of Table 1, when the conditions that $S_1(n)$ is not zero, the denominator $S_2(n-1)$ of $p_2$ is not zero, $S_2(n)=0$, and $S_1(n)>0$ are all satisfied, the rotation angle θ(n) is computed as 60°. Further, as shown in the sixth row from the top of Table 1, when the conditions that $S_1(n)$ is not zero, the denominator $S_2(n-1)$ of $p_2$ is not zero, $S_2(n)=0$, and $S_1(n)<0$ are all satisfied, the rotation angle θ(n) is computed as −120°.

The seventh and eighth arithmetic expressions from the top of Table 1 are arithmetic expressions used when the denominator $S_2(n-1)$ of $p_2$ is zero. Because $S_2(n-1)=A_2 \sin(\theta(n-1)+120)$, when $\sin(\theta(n-1)+120)=0$, $S_2(n-1)=0$ is satisfied. That is, when θ(n−1) is −120° or 60°, $S_2(n-1)$ is zero. Because $S_1(n-1)=A_1 \sin \theta(n-1)$, $S_1(n-1)<0$ is satisfied when θ(n−1) is −120°, and $S_1(n-1)>0$ is satisfied when θ(n−1) is 60°. Therefore, θ(n−1)=60 is satisfied when $S_2(n-1)=0$ and $S_1(n-1)>0$, and θ(n−1)=−120 is satisfied when $S_2(n-1)=0$ and $S_1(n-1)<0$.

When θ(n−1)=60, the expressions (4a), (4b) are expressed by the following expressions (16a), (16b), respectively.

$$S_1(n)=A_1 \sin \theta(n) \quad (16a)$$

$$S_1(n-1)=A_1 \sin 60 = \sqrt{3}/2 \cdot A_1 \quad (16b)$$

On the basis of the expression (16b), the following expression (17) can be obtained.

$$A_1=(2/\sqrt{3}) \cdot S_1(n-1) \quad (17)$$

When the expression (17) is substituted into the expression (16a), the following expression (18) can be obtained.

$$\sin \theta(n)=(\sqrt{3}/2) \cdot (S_1(n)/S_1(n-1)) \quad (18)$$

Therefore, the rotation angle θ(n) can be computed by the following expression (19).

$$\theta[n] = \sin^{-1}\left(\frac{\sqrt{3}}{2} \cdot \frac{S_1[n]}{S_1[n-1]}\right) \quad (19)$$

As shown in the seventh row from the top of Table 1, when the conditions that $S_1(n)$ is not zero, the denominator $S_2(n-1)$ of $p_2$ is zero, and $S_1(n-1)>0$ are all satisfied, the rotation angle θ(n) is computed according to the arithmetic expression expressed by the expression (19).

On the other hand, when θ(n−1)=−120, the expressions (4a), (4b) are expressed by the following expressions (20a), (20b), respectively.

$$S_1(n)=A_1 \sin \theta(n) \quad (20a)$$

$$S_1(n-1)=A_1 \sin(-120) = -\sqrt{3}/2 \cdot A_2 \quad (20b)$$

The following expression (21) can be obtained from the expression (20b).

$$A_1=(-\sqrt{2}/3) \cdot S_1(n-1) \quad (21)$$

When the expression (21) is substituted into the expression (20a), the following expression (22) can be obtained.

$$\sin \theta(n)=(-\sqrt{3}/2) \cdot (S_1(n)/S_1(n-1)) \quad (22)$$

Therefore, the rotation angle θ(n) can be computed according to the following expression (23).

$$\theta[n] = \sin^{-1}\left(-\frac{\sqrt{3}}{2} \cdot \frac{S_1[n]}{S_1[n-1]}\right) \quad (23)$$

As expressed by the eighth row from the top of Table 1, when the conditions that $S_1(n)$ is not zero, the denominator $S_2(n-1)$ of $p_2$ is zero, and $S_1(n-1)<0$ are all satisfied, the rotation angle θ(n) is computed according to an arithmetic expression expressed by the expression (23). The ninth and tenth arithmetic expressions from the top of Table 1 are arithmetic expressions that are used when $S_1(n)=0$ is satisfied. Because $S_1(n)=A_1 \sin \theta(n)$, when $\sin \theta(n)=0$, $S_1(n)=0$ is satisfied. That is, when θ(n) is 0° or 180°, $S_1(n)=0$ is satisfied. Because $S_2(n)=A_2 \sin(\theta(n)+120)$, $S_2(n)>0$ is satisfied when θ(n) is 0°, and $S_2(n)<0$ is satisfied when θ(n) is 180°. Therefore, θ(n)=0 is satisfied when $S_1(n)=0$ and $S_2(n)>0$, and θ(n)=180 is satisfied when $S_1(n)=0$ and $S_2(n)<0$.

As shown in the ninth row from the top of Table 1, when the conditions that $S_1(n)$ is zero and $S_2(n)>0$ are both satisfied, the rotation angle θ(n) is computed as 0°. Further, as shown in the tenth row from the top of Table 1, when the conditions that $S_1(n)$ is zero and $S_2(n)<0$ are both satisfied, the rotation angle is computed as 180°. According to the first computing method, because the rotation angle θ(n) of the input shaft 8 is computed on the basis of the output signals from the two magnetic sensors 71, 72, which are sampled at two sampling timings, the highly accurate rotation angle can be computed. Furthermore, according to the first computing method, even if the number of expressions used to compute the rotation angle θ(n) of the input shaft 8 is smaller than the number of unknown quantities originally included in these expressions, the rotation angle θ(n) of the input shaft 8 can be computed. As a result, the number of sensor values required to compute the rotation angle θ(n) of the input shaft 8 can be reduced.

According to the first computing method, by setting a short sampling period, the amplitudes ($A_1(n)$ and $A_1(n-1)$; $A_2(n)$ and $A_2(n-1)$) of the output signals from the same magnetic sensor at the two sampling timings are assumed to be equal to each other. The amplitudes of the output signals from the same magnetic sensor at two sampling timings may be different values due to the influence of temperature changes. However, if the sampling interval is short, a temperature change between the two sampling timings is considerably small. Therefore, the amplitudes of the output signals from the same magnetic sensor at the two sampling timings may be assumed to be equal to each other. In the first computing method, variations of amplitudes due the influence of temperature changes between the two sampling timings can be compensated for. In the first computing method, because the amplitudes $A_1$, $A_2$ of the output signals from the magnetic sensors 71, 72 are regarded as different unknown quantities, the influence of variations of temperature characteristics between the magnetic sensors 71, 72 can be compensated for. As a result, the highly accurate rotation angle can be detected.

A basic concept of the second computing method will be described below. A phase difference (electrical angle)

between the first output signal $S_1$ and the second output signal $S_2$ will be denoted by C. The number of the present sampling period (the number of the present computation period) will be denoted by (n), the number of the immediately preceding sampling period will be denoted by (n−1), and the number of the second preceding sampling period will be denoted by (n−2). A correction value used to correct a rotation angle computing error due to the variations of angular widths (magnetic pole widths) of the magnetic poles M1 to M8 will be referred to as an angular width error correction value, and will be denoted by E.

When the phase difference C, the numbers of the sampling periods (n), (n−1), (n−2), and the angular width error correction value E are used, the first output signals $S_1$ sampled in the present sampling period, the immediately preceding sampling period, and the second preceding sampling period, and the second output signals $S_2$ sampled in the present sampling period, the immediately preceding sampling period, and the second preceding sampling period can be expressed by the following expressions (24a), (24b), (24c), (24d), (24e), (24f), respectively.

$$S_1(n)=A_1(n)\sin(E_1(n)\theta(n)) \tag{24a}$$

$$S_1(n-1)=A_1(n-1)\sin(E_1(n-1)\theta(n-1)) \tag{24b}$$

$$S_1(n-2)=A_1(n-2)\sin(E_1(n-2)\theta(n-2)) \tag{24c}$$

$$S_2(n)=A_2(n)\sin(E_2(n)\theta(n)+C) \tag{24d}$$

$$S_2(n-1)=A_2(n-1)\sin(E_2(n-1)\theta(n-1)+C) \tag{24e}$$

$$S_2(n-2)=A_2(n-2)\sin(E_2(n-2)\theta(n-2)+C) \tag{24f}$$

In the expressions (24a) to (24f), $E_1(x)$ is an angular width error correction value corresponding to a magnetic pole sensed by the first magnetic sensor 71 in an x-th computation period. $E_2(x)$ is an angular width error correction value corresponding to a magnetic pole sensed by the second magnetic sensor 72 in an x-th computation period.

If an angular width of a given magnetic pole is w (electrical angle), an angular width error $\theta_{err}$ (electrical angle) of the given magnetic pole can be defined by the following expression (25).

$$\theta_{err}=w-180 \tag{25}$$

The angular width error correction value E for this magnetic pole can be defined by the following expression (26).

$$E=180/w=180/(\theta_{err}+180) \tag{26}$$

The angular width error correction value E for each magnetic pole is a piece of information regarding a magnetic pole width of the magnetic pole. Note that the piece of information regarding the magnetic pole width of each magnetic pole may be an angular width w of the magnetic pole or an angular width error $\theta_{err}$ of the magnetic pole.

If C is a known quantity, the number of unknown quantities included in the six expressions expressed by the expressions (24a) to (24f) is 16. That is, because the number of the unknown quantities is greater than the number of the expressions, simultaneous equations constituted of the six expressions cannot be solved in this state. Therefore, by setting a short sampling interval (sampling period), variations of amplitudes due to temperature changes between three sampling timings are assumed to be non-existent. That is, on the assumption that amplitudes $A_1(n)$, $A_1(n-1)$ $A_1(n-2)$ of the output signals from the first magnetic sensor 71, which are sampled at three sampling timings, are equal to each other, the amplitudes $A_1(n)$, $A_1(n-1)$, $A_1(n-2)$ are expressed by $A_1$. Similarly, on the assumption that amplitudes $A_2(n)$, $A_2(n-1)$, $A_2(n-2)$ of the output signals from the second magnetic sensor 72, which are sampled at three sampling timings, are equal to each other, the amplitudes $A_2(n)$, $A_2(n-1)$, $A_2(n-2)$ are expressed by $A_2$.

Further, both the magnetic sensors 71, 72 are assumed to sense one and the same magnetic pole at three sampling timings. That is, all the angular width error correction values $E_1(n)$, $E_1(n-1)$, $E_1(n-2)$, $E_2(n)$, $E_2(n-1)$, $E_2(n-2)$ included in the output signals from the magnetic sensors 71, 72, which are sampled at the three sampling timings, are assumed to be angular width error correction values for one and the same magnetic pole, and they will be denoted by E. Thus, the expressions (24a) to (24f) can be expressed by the following expressions (27a) to (27f), respectively.

$$S_1(n)=A_1 \sin(E\theta(n)) \tag{27a}$$

$$S_1(n-1)=A_1 \sin(E\theta(n-1)) \tag{27b}$$

$$S_1(n-2)=A_1 \sin(E\theta(n-2)) \tag{27c}$$

$$S_2(n)=A_2 \sin(E\theta(n)+C) \tag{27d}$$

$$S_2(n-1)=A_2 \sin(E\theta(n-1)+C) \tag{27e}$$

$$S_2(n-2)=A_2 \sin(E\theta(n-2)+C) \tag{27f}$$

The number of unknown quantities ($A_1$, $A_2$, E, $\theta(n)$, $\theta(n-1)$, $\theta(n-2)$) included in these six expressions is six. That is, the number of the unknown quantities is equal to or smaller than the number of the expressions, and hence simultaneous equations constituted of the six expressions can be solved. Therefore, by solving the simultaneous equations constituted of the six expressions (27a) to (27f), the rotation angle $\theta(n)$ of the input shaft 8 can be computed.

Hereinafter, the case where the phase difference C between the sinusoidal signals output from the magnetic sensors 71, 72 is 120° will be described in detail. When the phase difference C is 120°, the six expressions (27a) to (27f) can be expressed by the following expressions (28a) to (28f), respectively.

$$S_1(n)=A_1 \sin(E\theta(n)) \tag{28a}$$

$$S_1(n-1)=A_1 \sin(E\theta(n-1)) \tag{28b}$$

$$S_1(n-2)=A_1 \sin(E\theta(n-2)) \tag{28c}$$

$$S_2(n)=A_2 \sin(E\theta(n)+120) \tag{28d}$$

$$S_2(n-1)=A_2 \sin(E\theta(n-1)+120) \tag{28e}$$

$$S_2(n-2)=A_2 \sin(E\theta(n-2)+120) \tag{28f}$$

According to the basic arithmetic expression (5), $E\theta(n)$ can be expressed by the following expression (29).

$$E\theta[n] = \frac{1}{4}\cos^{-1}\left(1 - \frac{(3p_1^2 p_2^2 - 2p_1^2 - 2p_2^2 + p_1 p_2)^2}{2(p_1-p_2)^2(p_1^2 + p_1 p_2 + p_2^2)}\right) - \frac{1}{4}\cos^{-1}\left(\frac{1}{2} - \frac{3}{2} \cdot \frac{p_1 p_2 + p_2^2}{p_1^2 + p_1 p_2 + p_2^2}\right) \tag{29}$$

where $$p_1 = \frac{S_1[n]}{S_1[n-1]}$$

$$p_2 = \frac{S_2[n]}{S_2[n-1]}$$

Furthermore, by solving simultaneous equations constituted of the six expressions (28a) to (28f), the angular width error correction value E can be expressed by the following expression (30).

$$E = \frac{1}{240} \cdot \cos^{-1}\left(\frac{q_1^2 t^2 - 2q_1 q_2 t + q_2^2}{2t(S_1[n]S_2[n] - S_1[n-1]S_2[n-1])^2} - 1\right) \quad (30)$$

where $$q_1 = S_1[n-1]^2 - S_1[n]^2$$

$$q_2 = S_2[n]^2 - S_2[n-1]^2$$

$$t = \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_6 + S_1[n-2]S_2[n-2]q_2}$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

By dividing Eθ(n) computed from the expression (29) by the angular width error correction value E obtained from the expression (30), θ(n) can be obtained. That is, θ(n) can be obtained according to the following expression (31).

$$\theta(n) = E\theta(n)/E \quad (31)$$

Note that, Eθ(n) is computed according to the arithmetic expression corresponding to the conditions according to Table 1. Further, when at least one of the denominators of the fractions included in the expression (30) is zero, the angular width error correction value E cannot be computed according to the expression (30). Therefore, in the present embodiment, when at least one of the denominators of the fractions included in the expression (30) is zero, the immediately preceding computed angular width error correction value E is used as the present angular width error correction value E.

Note that the case where at least one of the denominators of the fractions included in the expression (30) is zero is the case where at least one of the three conditions expressed by the following expressions (32), (33), (34) is satisfied.

$$S_1[n]S_2[n] - S_1[n-1]S_2[n-1] = 0 \quad (32)$$

$$S_1[n]S_2[n]q_3 + S_1[n-1]S_2[n-1]q_4 + S_1[n-2]S_2[n-2]q_1 = 0 \quad (33)$$

$$S_1[n]S_2[n]q_5 + S_1[n-1]S_2[n-1]q_6 + S_1[n-2]S_2[n-2]q_2 = 0 \quad (34)$$

$$q_1 = S_1[n-1]^2 - S_1[n]^2$$

$$q_2 = S_2[n]^2 - S_2[n-1]^2$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

According to the second computing method, because the rotation angle θ(n) of the input shaft 8 is computed on the basis of the output signals from the two magnetic sensors 71, 72, which are sampled at three sampling timings, the highly accurate rotation angle can be computed. In the second computing method, even if the number of expressions used to compute the rotation angle θ(n) of the input shaft 8 is smaller than the number of unknown quantities originally included in these expressions, the rotation angle θ(n) of the input shaft 8 can be computed, and hence the number of sensor values required to compute the rotation angle θ(n) of the input shaft 8 can be reduced.

According to the second computing method, the amplitudes ($A_1$(n), $A_1$(n−1) and $A_1$(n−2); $A_2$(n), $A_2$(n−1) and $A_2$(n−2)) of the output signals from the same magnetic sensor, which are sampled at the three sampling timings, are assumed to be equal to each other. The amplitudes of the output signals from the same magnetic sensor, which are sampled at three sampling timings, may be different values due to the influence of temperature changes. However, if the sampling interval is short, a temperature change between the three sampling timings is considerably small. Therefore, the amplitudes of the output signals from the same magnetic sensor, which are sampled at the three sampling timings, may be assumed to be equal to each other. Therefore, in the second computing method, variations of amplitudes due the influence of temperature changes between the three sampling timings can be compensated for. In the second computing method, because the amplitudes $A_1$, $A_2$ of the output signals from the magnetic sensors 71, 72 are regarded as different unknown quantities, the influence of variations of temperature characteristics between the magnetic sensors 71, 72 can be compensated for. As a result, the highly accurate rotation angle can be detected.

In the second computing method, all the angular width error correction values E included in the six expressions used to compute the rotation angle θ(n) are assumed to be equal to each other. The angular width error correction value E varies from one magnetic pole to another. Therefore, the angular width error correction values E included in the expressions that express the six output signals $S_1$(n), $S_1$(n−1), $S_1$(n−2), $S_2$(n), $S_2$(n−1), $S_2$(n−2) used to compute the rotation angle θ(n) do not always take the same value. However, when the two magnetic sensors 71, 72 sense one and the same magnetic pole at three sampling timings, all the angular width error correction values E included in the expressions that express the output signals take the same value. Therefore, in the second computing method, when the two magnetic sensors 71, 72 sense one and the same magnetic pole at three sampling timings, variations of angular widths (magnetic pole widths) of the magnetic poles M1 to M8 of the magnet 61 can be compensated for. As a result, the highly accurate rotation angle can be detected.

Next, the rotation angle computing method in the simple mode will be described. The simple mode is a mode in which the rotation angle θ of the input shaft 8 is computed on the basis of the output signals from the first magnetic sensor 71 and the second magnetic sensor 72, which are sampled at one sampling timing, and the amplitude ratio between the output signals from the two magnetic sensors 71, 72 stored in the nonvolatile memory. As explained in the above description on the second computing method, the first output signal $S_1$ and the second output signal $S_2$, which are sampled at the present sampling timing, are expressed by the following expressions (35), (36), respectively.

$$S_1(n) = A_1(n)\sin(E_1(n)\theta(n)) \quad (35)$$

$$S_2(n) = A_2(n)\sin(E_2(n)\theta(n) + C) \quad (36)$$

$A_1$(n) will be denoted by $A_1$, and $A_2$(n) will be denoted by $A_2$. Further, both the magnetic sensors 71, 72 are assumed to detect the same magnetic pole. $E_1$(n) and $E_2$(n) are assumed to be angular width error correction values corresponding to the same magnetic pole, and will be denoted by E. Thus, the expressions (35), (36) can be expressed by the following expressions (37), (38), respectively.

$$S_1(n) = A_1 \sin(E\theta(n)) \tag{37}$$

$$S_2(n) = A_2 \sin(E\theta(n) + C) \tag{38}$$

When a ratio $S_2(n)/S_1(n)$ of the second output signal $S_2(n)$ to the first output signal $S_1(n)$ is computed, the following expression (39) can be obtained.

$$\frac{S_2[n]}{S_1[n]} = \frac{A_2}{A_1} \cdot \frac{\sin(E\theta[n] + C)}{\sin E\theta[n]} \tag{39}$$
$$= \frac{A_2}{A_1} \left\{ \frac{\sin E\theta[n] \cos EC}{\sin E\theta[n]} + \frac{\cos E\theta[n] \sin EC}{\sin E\theta[n]} \right\}$$
$$= \frac{A_2}{A_1} \left\{ \cos EC + \frac{\sin EC}{\tan E\theta[n]} \right\}$$

When tan $E\theta(n)$ is obtained from the expression (39), the following expression (40) is obtained.

$$\tan E\theta[n] = \frac{A_2}{A_1} \cdot \sin EC \cdot \frac{1}{\left( \frac{S_2[n]}{S_1[n]} - \frac{A_2}{A_1} \cos EC \right)} \tag{40}$$

When $\theta(n)$ is obtained from the expression (40), the following expression (41) is obtained.

$$\theta[n] = \frac{1}{E} \cdot \tan^{-1} \left\{ \frac{A_2}{A_1} \cdot \sin EC \cdot \frac{1}{\frac{S_2[n]}{S_1[n]} - \frac{A_2}{A_1} \cos EC} \right\} \tag{41}$$

In the expression (41), the angular width error correction value E is assumed to be one. The amplitude ratio $A_2/A_1$ of the amplitude $A_2$ of the second output signal $S_2$ from the second magnetic sensor 72 to the amplitude $A_1$ of the first output signal $S_1$ from the first magnetic sensor 71 is obtained and set in advance. In the simple mode, the rotation angle $\theta(n)$ of the input shaft 8 is computed with the use of the first and second sensor values $S_1(n)$, $S_2(n)$, which are sampled at the present sampling timing, the amplitude ratio $A_2/A_1$ set in advance, and the expression (41).

The amplitude ratio $A_2/A_1$ is computed before the shipment of the power steering system, and it is stored in the nonvolatile memory of the torque computation ECU 77. A method of computing the amplitude ratio $A_2/A_1$ will be described. The amplitude ratio $A_2/A_1$ can be computed in advance on the basis of sensor values, which are sampled at three sampling timings and which are obtained when the two magnetic sensors 71, 72 keep sensing the same magnetic pole while the steering wheel 2 is rotated. The six expressions (28a) to (28f) can be obtained from these sensor values that are sampled at the three sampling timings.

$$S_1(n) = A_1 \sin(E\theta(n)) \tag{28a}$$

$$S_1(n-1) = A_1 \sin(E\theta(n-1)) \tag{28b}$$

$$S_1(n-2) = A_1 \sin(E\theta(n-2)) \tag{28c}$$

$$S_2(n) = A_2 \sin(E\theta(n) + 120) \tag{28d}$$

$$S_2(n-1) = A_2 \sin(E\theta(n-1) + 120) \tag{28e}$$

$$S_2(n-2) = A_2 \sin(E\theta(n-2) + 120) \tag{28f}$$

By solving simultaneous equations formed of these six expressions, the amplitude ratio $A_2/A_1$ can be computed.

Specifically, when $(A_2/A_1)^2$ is computed on the basis of the six expressions, t in the expression (30) for computing E is obtained. Therefore, the amplitude ratio $A_2/A_1$ can be obtained according to the following expression (42).

$$\frac{A_2}{A_1} = \tag{42}$$
$$\left( \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_6 + S_1[n-2]S_2[n-2]q_2} \right)^{\frac{1}{2}}$$

where $$q_1 = S_1[n-1]^2 - S_1[n]^2$$
$$q_2 = S_2[n]^2 - S_2[n-1]^2$$
$$q_3 = S_1[n-2]^2 - S_1[n-1]^2$$
$$q_4 = S_1[n]^2 - S_1[n-2]^2$$
$$q_5 = S_2[n-1]^2 - S_2[n-2]^2$$
$$q_6 = S_2[n-2]^2 - S_2[n]^2$$

In such a simple mode, variations of the output signals due to temperatures of the magnetic sensors 71, 72 cannot be compensated for, but variations of magnetic flux density among the magnetic poles of the magnet 61 and variations of Hall coefficients and thicknesses of Hall elements between the magnetic sensors 71, 72 can be compensated for. Therefore, it is possible to compute the rotation angle $\theta(n)$ with a high degree of accuracy although the accuracy is not as high as that in the normal mode. The reason for this will be described.

The amplitudes $A_1$, $A_2$ can be expressed by the following expressions (43), (44).

$$A_1 = \frac{R_{H1}}{d_1} \cdot I_C \cdot B_M + \frac{R_{H1}}{d_1} \cdot I_C \cdot B_M \times (t_1 - 25) \times (\alpha_{S1} + \alpha_M) \tag{43}$$

$$A_2 = \frac{R_{H2}}{d_2} \cdot I_C \cdot B_M + \frac{R_{H1}}{d_2} \cdot I_C \cdot B_M \times (t_2 - 25) \times (\alpha_{S2} + \alpha_M) \tag{44}$$

$R_{H1}$: Hall coefficient (m³/c) of the first magnetic sensor
$R_{H2}$: Hall coefficient (m³/c) of the second magnetic sensor
$d_1$: thickness (m) of a Hall element of the first magnetic sensor
$d_2$: thickness (m) of a Hall element of the second magnetic sensor
$I_C$: control current (A) of each magnetic sensor
$B_M$: magnetic flux density (wb/m²) of the magnet (the magnetic pole)
$t_1$: temperature (° C.) of the first magnetic sensor
$t_2$: temperature (° C.) of the second magnetic sensor
$\alpha_{s1}$: temperature coefficient (%/° C.) of the first magnetic sensor
$\alpha_{s2}$: temperature coefficient (%/° C.) of the second magnetic sensor
$\alpha_M$: temperature coefficient of each magnetic pole (%/° C.)

The first term of the right side of the expression (43) represents the amplitude of the output signal from the first magnetic sensor 71 when the temperature of the first magnetic sensor 71 is 25° C. The second term of the right side of the expression (43) represents the difference between the amplitude of the output signal from the first magnetic sensor 71 when the temperature of the first magnetic sensor 71 is $t_1$ and the amplitude of the output signal from the first magnetic sensor 71 when the temperature of the first magnetic sensor 71 is 25° C.

Similarly, the first term of the right side of the expression (44) represents the amplitude of the output signal from the second magnetic sensor 72 when the temperature of the second magnetic sensor 72 is 25° C. The second term of the right side of the expression (44) represents the difference between the amplitude of the output signal from the second magnetic sensor 72 when the temperature of the second magnetic sensor 72 is $t_2$ and the amplitude of the output signal from the second magnetic sensor 72 when the temperature of the second magnetic sensor 72 is 25° C.

When the amplitude ratio $A_2/A_1$ is computed on the basis of the expressions (43), (44), the following expression (45) is obtained.

$$\frac{A_2}{A_1} = \frac{\frac{R_{H2}}{d_2}}{\frac{R_{H1}}{d_1}} \left\{ 1 + \frac{(t_2 - 25) \times (\alpha_{S2} + \alpha_M)}{(t_1 - 25) \times (\alpha_{S1} + \alpha_M)} \right\} \quad (45)$$

As can be understood from the expression (45), because the magnetic flux density $B_M$ is no longer present in the arithmetic expression for computing the amplitude ratio $A_2/A_1$, variations of the magnetic flux density among the magnetic poles of the magnet 61 can be compensated for. Because a ratio $R_{H2}/R_{H1}$ of the Hall coefficient of the second magnetic sensor 72 to the Hall coefficient of the first magnetic sensor 71 and a thickness ratio $d_1/d_2$ between the Hall elements are reflected in the amplitude ratio $A_2/A_1$, variations of the Hall coefficients and thicknesses of the Hall elements between the magnetic sensors 71, 72 can be compensated for.

Meanwhile, as can be understood from the expression (45), if the temperatures $t_1$, $t_2$ of the respective magnetic sensors 71, 72 when the amplitude ratio $A_2/A_1$ is computed are different from temperatures $t_1'$ and $t_2'$ of the respective magnetic sensors 71, 72 when the rotation angle $\theta(n)$ is computed in the simple mode, the amplitude ratio $A_2/A_1$ set in advance does not coincide with the actual amplitude ratio $A_2/A_1$ at the time of when the rotation angle is computed, an error is contained in the computed rotation angle $\theta(n)$. This error is larger as the difference between the temperatures $t_1$, $t_2$ at the time when the amplitude ratio $A_2/A_1$ is computed and the temperatures $t_1'$, $t_2'$ at the time when the rotation angle is computed is larger. Therefore, it is preferable to compute the amplitude ratio $A_2/A_1$ at a temperature that is considered to be highly frequently attained, for example, a temperature at normal temperature or a temperature in a warmed-up state achieved after the vehicle travels for a predetermined time set in advance.

The reason why the simple mode is provided will be described. In the first computing method and the second computing method described above, if the output signals $S_1$, $S_2$ from the respective magnetic sensors 71, 72 are not changed between the immediately preceding sampling timing and the present sampling timing, $p_1 = p_2$ is satisfied, and hence the immediately preceding computed rotation angle $\theta(n)$ is used as the rotation angle $\theta(n)$ (see the second arithmetic expression from the top of Table 1). However, at the time when the power supply for the torque computation ECU 77 is turned on by turning on the ignition key, there is no immediately preceding computed rotation angle $\theta(n)$. Therefore, if the output signals $S_1$, $S_2$ from the respective magnetic sensors 71, 72 do not change after the power supply for the torque computation ECU 77 is turned on, the rotation angle $\theta(n)$ cannot be computed according to the first computing method and the second computing method. The simple mode is provided in order to compute the rotation angle $\theta(n)$ of the input shaft 8 in such a case.

Figure 5:
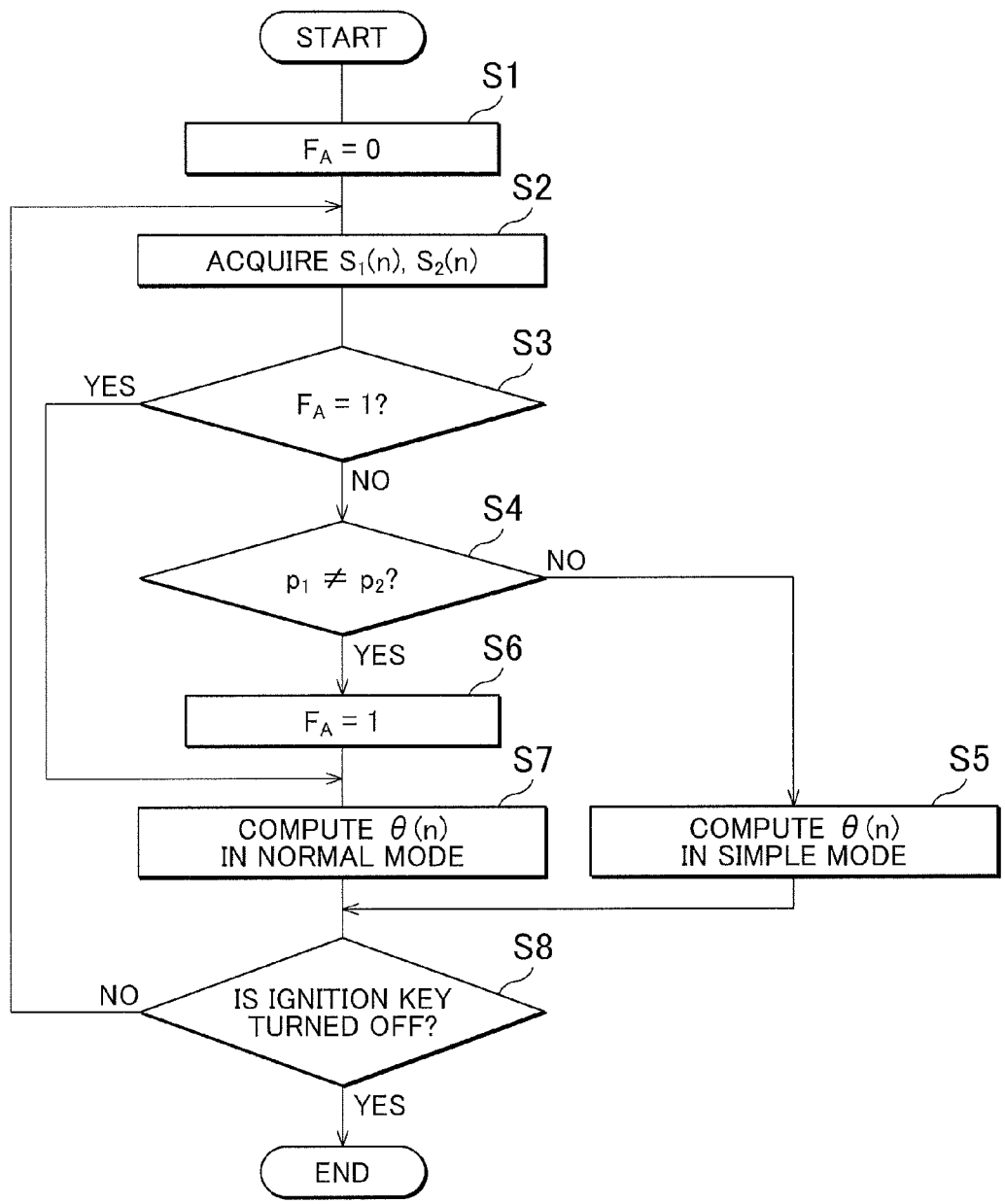
FIG. 5 is a flowchart showing the operation of a first rotation angle computation unit in the case where a first computing method is employed in a normal mode.

FIG. 5 is a flowchart showing the operation of the first rotation angle computation unit 77A in the case where the first computing method is employed in the normal mode. When the power supply for the torque computation ECU 77 is turned on, the first rotation angle computation unit 77A resets a mode flag $F_A$ for storing the computation mode ($F_A = 0$) (step S1). The first rotation angle computation unit 77A obtains the first sensor value $S_1(n)$ and the second sensor value $S_2(n)$ (step S2). The process in step S2 is repeatedly executed with a predetermined computation period until the ignition key is turned off. A memory in the torque computation ECU 77 stores the sensor values from the sensor value obtained n-th preceding timing (n is a prescribed value) to the sensor value obtained most recently. The first rotation angle computation unit 77A determines whether the mode flag $F_A$ is set (step S3).

When the mode flag $F_A$ is not set ($F_A = 0$) (NO in step S3), the first rotation angle computation unit 77A determines whether the condition under which the rotation angle $\theta(n)$ of the input shaft 8 can be computed in the normal mode (the first computing method) even if the immediately preceding value of the rotation angle of the input shaft 8 is not present is satisfied (step S4). To compute the rotation angle $\theta(n)$ of the input shaft 8 according to the first computing method even if the immediately preceding value of the rotation angle of the input shaft 8 is not present, it is necessary to satisfy the condition that sensor values from each one of the magnetic sensors 71, 72, which are sampled at two sampling timings, are different from each other. Thus, the first rotation angle computation unit 77A determines whether $p_1$ and $p_2$ (see the expression (5)) are unequal to each other ($p_1 \neq p_2$).

If $p_1$ is not unequal to $p_2$ ($p_1 = p_2$) (NO in step S4), the first rotation angle computation unit 77A determines that the condition is not satisfied and computes the rotation angle $\theta(n)$ ($=\theta_A$) of the input shaft 8 in the simple mode (step S5). The first rotation angle computation unit 77A provides the computed rotation angle $\theta_A$ of the input shaft 8 and the value of the mode flag $F_A$ ($F_A = 0$) to the torque computation unit 77C (see FIG. 2). Then, the first rotation angle computation unit 77A proceeds on to step S8.

If it is determined in step S4 that $p_1$ and $p_2$ are unequal to each other (p1≠p2) (YES in step S4), the first rotation angle computation unit 77A determines that the condition is satisfied and sets the mode flag $F_A$ ($F_A = 1$) (step S6). Then, the first rotation angle computation unit 77A computes the rotation angle $\theta(n)$ of the input shaft 8 in the normal mode (step S7). That is, the first rotation angle computation unit 77A computes the rotation angle $\theta(n)$ ($=\theta_A$) of the input shaft 8 according to the first computing method. The first rotation angle computation unit 77A provides the computed rotation angle $\theta_A$ of the input shaft 8 and the value of the mode flag $F_A$ ($F_A = 1$) to the torque computation unit 77C. Then, the first rotation angle computation unit 77A proceeds on to step S8.

In step S8, the first rotation angle computation unit 77A determines whether the ignition key is turned off. If the ignition key is not turned off (NO in step S8), the first rotation angle computation unit 77A returns to step S2 and obtains the first sensor value $S_1(n)$ and the second sensor value $S_2(n)$ again. In step S3, if it is determined that the mode flag $F_A$ is set ($F_A=1$) (YES in step S3), the first rotation angle computation unit 77A proceeds on to step S7 and computes the rotation angle $\theta(n)$ of the input shaft 8 in the normal mode.

If it is determined in step S8 that the ignition key is turned off (YES in step S8), the first rotation angle computation unit 77A ends the process. The second rotation angle computation unit 77B (see FIG. 2) executes the same process as that executed by the first rotation angle computation unit 77A, with the use of the output signals $S_4$, $S_5$ from the two magnetic sensors 74, 75 and a mode flag $F_B$ for storing the computation mode. The second rotation angle computation unit 77B (see FIG. 2) computes the rotation angle $\theta(n)$ ($=\theta_B$) of the output shaft 9, and provides the computed rotation angle $\theta_B$ together with the value of the mode flag $F_B$ to the torque computation unit 77C. The torque computation unit 77C computes the steering torque Th according to the expression (1). Then, the torque computation unit 77C provides the computed steering torque Th together with the value of the mode flag $F_A$ or $F_B$ to the motor control ECU 12.

In the process in FIG. 5, after the power supply for the torque computation ECU 77 is turned on, the rotation angle $\theta(n)$ of the input shaft 8 is computed in the simple mode until it is determined in step S4 that the condition that $p_1 \neq p_2$ is satisfied (see steps S1 to S5). After the power supply for the torque computation ECU 77 is turned on, when it is determined in step S4 that the condition that $p_1 \neq p_2$ is satisfied and thereafter, the rotation angle $\theta(n)$ of the input shaft 8 is computed in the normal mode (the first computing method) (see steps S2, S3, S4, S6, S7). Therefore, the rotation angle $\theta(n)$ of the input shaft 8 can be computed from immediately after the power supply for the torque computation ECU 77 is turned on. After it is determined in step S4 that the condition that $p_1 \neq p_2$ is satisfied, the rotation angle $\theta(n)$ of the input shaft 8 is computed in the normal mode, and hence the highly accurate rotation angle can be computed.

Figure 6:
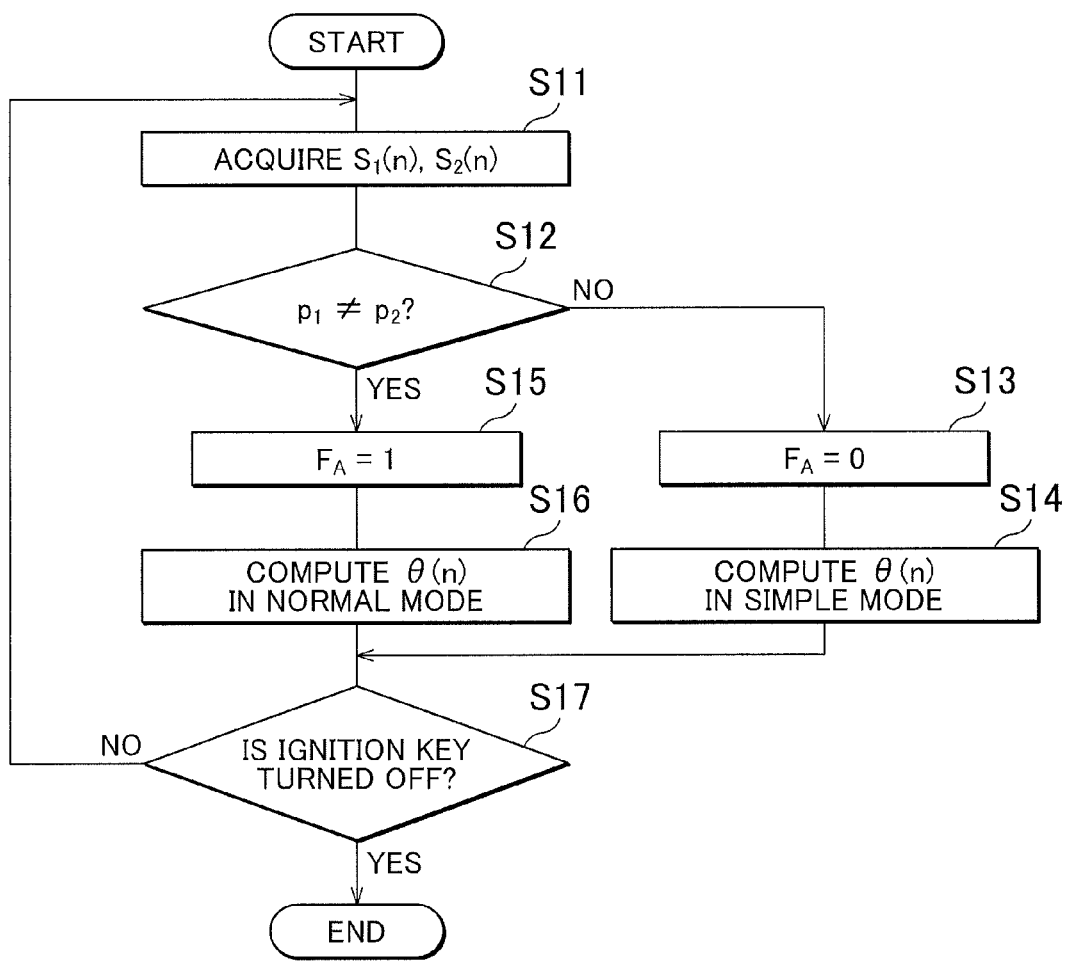
FIG. 6 is a flowchart showing another example of the operation of the first rotation angle computation unit in the case where the first computing method is employed in the normal mode.

FIG. 6 is a flowchart showing another example of the operation of the first rotation angle computation unit 77A when the first computing method is employed in the normal mode. When the power supply for the torque computation ECU 77 is turned on, the first rotation angle computation unit 77A obtains the first sensor value $S_1(n)$ and the second sensor value $S_2(n)$ (step S11). The process in step S11 is repeatedly executed with a predetermined computation period until the ignition key is turned off. A memory in the torque computation ECU 77 stores the sensor values from the sensor value obtained n-th preceding timing (n is a prescribed value) to the sensor value obtained most recently.

The first rotation angle computation unit 77A determines whether the condition under which the rotation angle $\theta(n)$ of the input shaft 8 can be computed in the normal mode (the first computing method) even if the immediately preceding value of the rotation angle of the input shaft 8 is not present is satisfied (step S12). Specifically, it is determined whether $p_1$ and $p_2$ (see the expression (5)) are unequal to each other ($p_1 \neq p_2$). If $p_1$ and $p_2$ are not unequal to each other ($p_1 = p_2$) (NO in step S12), the first rotation angle computation unit 77A resets the mode flag $F_A$ for storing the computation mode ($F_A=0$) (step S13), and then computes the rotation angle $\theta(n)$ ($=\theta_A$) of the input shaft 8 in the simple mode (step S14). The first rotation angle computation unit 77A provides the computed rotation angle $\theta_A$ of the input shaft 8 and the value of the mode flag $F_A$ ($F_A=0$) to the torque computation unit 77C. Then, the first rotation angle computation unit 77A proceeds on to step S17.

If it is determined in step S12 that $p_1$ and $p_2$ are unequal to each other ($p_1 \neq p_2$) (YES in step S12), the first rotation angle computation unit 77A sets the mode flag $F_A$ ($F_A=1$) (step S15) and then computes the rotation angle $\theta(n)$ of the input shaft 8 in the normal mode (step S16). That is, the first rotation angle computation unit 77A computes the rotation angle $\theta(n)$ ($=\theta_A$) of the input shaft 8 according to the first computing method. The first rotation angle computation unit 77A provides the computed rotation angle $\theta_A$ of the input shaft 8 and the value of the mode flag $F_A$ ($F_A=1$) to the torque computation unit 77C. Then, the first rotation angle computation unit 77A proceeds on to step S17.

In step S17, the first rotation angle computation unit 77A determines whether the ignition key is turned off. If the ignition key is not turned off (NO in step S17), the first rotation angle computation unit 77A returns to step S11 and obtains the first sensor value $S_1(n)$ and the second sensor value $S_2(n)$ again. In step S17, if it is determined that the ignition key is turned off (YES in step S17), the first rotation angle computation unit 77A ends the process.

In the process in FIG. 6, if it is determined that the condition that $p_1 \neq p_2$ is not satisfied in step S12, the rotation angle $\theta(n)$ of the input shaft 8 is computed in the simple mode (see steps S11 to S14). If it is determined in step S12 that the condition that $p_1 \neq p_2$ is satisfied, the rotation angle $\theta(n)$ of the input shaft 8 is computed in the normal mode (the first computing method) (see steps S11, S12, S15, S16). Therefore, the rotation angle $\theta(n)$ of the input shaft 8 can be computed from immediately after the power supply for the torque computation ECU 77 is turned on. On the other hand, if it is determined in step S12 that the condition that $p_1 \neq p_2$ is satisfied, the rotation angle $\theta(n)$ of the input shaft 8 is computed in the normal mode, and hence the highly accurate rotation angle can be computed.

Figure 7:
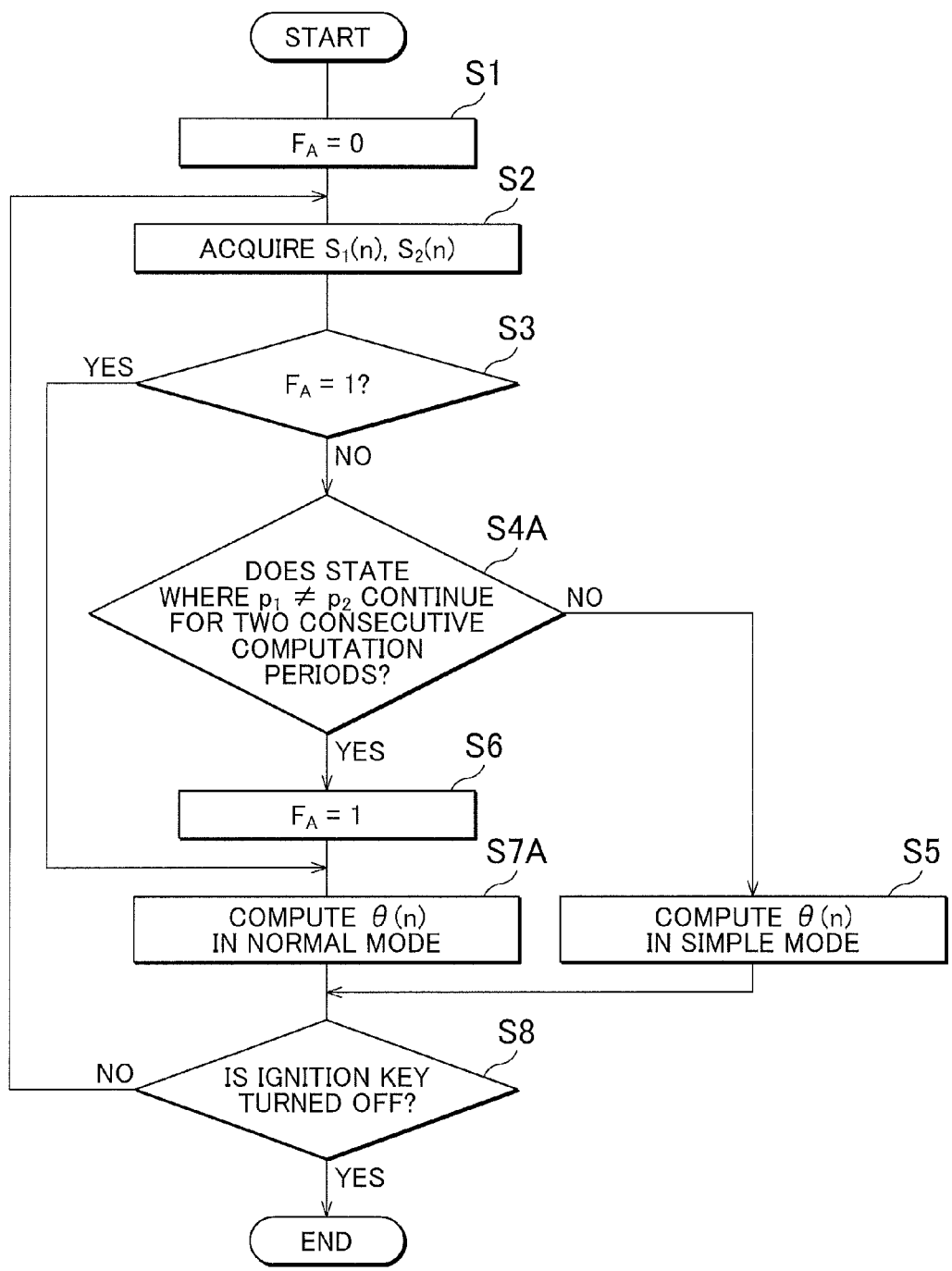
FIG. 7 is a flowchart showing the operation of the first rotation angle computation unit in the case where a second computing method is employed in the normal mode.

FIG. 7 is a flowchart showing the operation of the first rotation angle computation unit 77A in the case where the second computing method is employed in the normal mode. The process in FIG. 7 is similar to the process in FIG. 5. In FIG. 7, steps in which the same processes as those in steps in FIG. 5 are executed are denoted by the same reference symbols as those in FIG. 5. Because the processes in steps S51 to S58 in FIG. 19 are the same as the processes in step S51 to S58 in FIG. 13, description thereof will be omitted. The process in FIG. 7 is the same as the process in FIG. 5 except that the processes in steps S4A, S7A in FIG. 7 differ from the processes in steps S4, S6 in FIG. 5. Therefore, only the processes in steps S4A, S7A will be described.

Because the second computing method is employed in the normal mode, in step S7A, the first rotation angle computation unit 77A computes the rotation angle $\theta(n)$ of the input shaft 8 according to the second computing method. In order to compute the rotation angle $\theta(n)$ of the input shaft 8 according to the second computing method in the case where the immediately preceding value of the rotation angle is not present, it is necessary to satisfy the condition that sensor values from each one of the magnetic sensors 71, 72, which are sampled at three sampling timings, are different from each other. In step S4A, the first rotation angle computation unit 77A determines whether the state where $p_1$ and $p_2$ are unequal to each other ($p_1 \neq p_2$) continues for two consecutive computation periods. That is, it is determined whether the condition that $p_1$ and $p_2$ are unequal to each other in the immediately preceding computation period and $p_1$ and $p_2$ are unequal to each other in the present computation period is satisfied.

If it is determined in step S4A that the state where $p_1 \neq p_2$ does not continue for two consecutive computation periods (NO in step S4A), the condition that the sensor values from each one of the magnetic sensors 71, 72, which are sampled at three sampling timings, differ from each other is not satisfied. Therefore, the first rotation angle computation unit 77A proceeds on to step S5, and computes the rotation angle θ(n) of the input shaft 8 in the simple mode. On the other hand, if it is determined in step S4A that the state where $p_1 \neq p_2$ continues for two consecutive computation periods (YES in step S4A), the condition that the sensor values from each one of the magnetic sensors 71, 72, which are sampled at three sampling timings, differ from each other is satisfied. Therefore, the first rotation angle computation unit 77A proceeds from step S6 on to step S7A, and computes the rotation angle θ(n) of the input shaft 8 in the normal mode (the second computing method).

Figure 8:
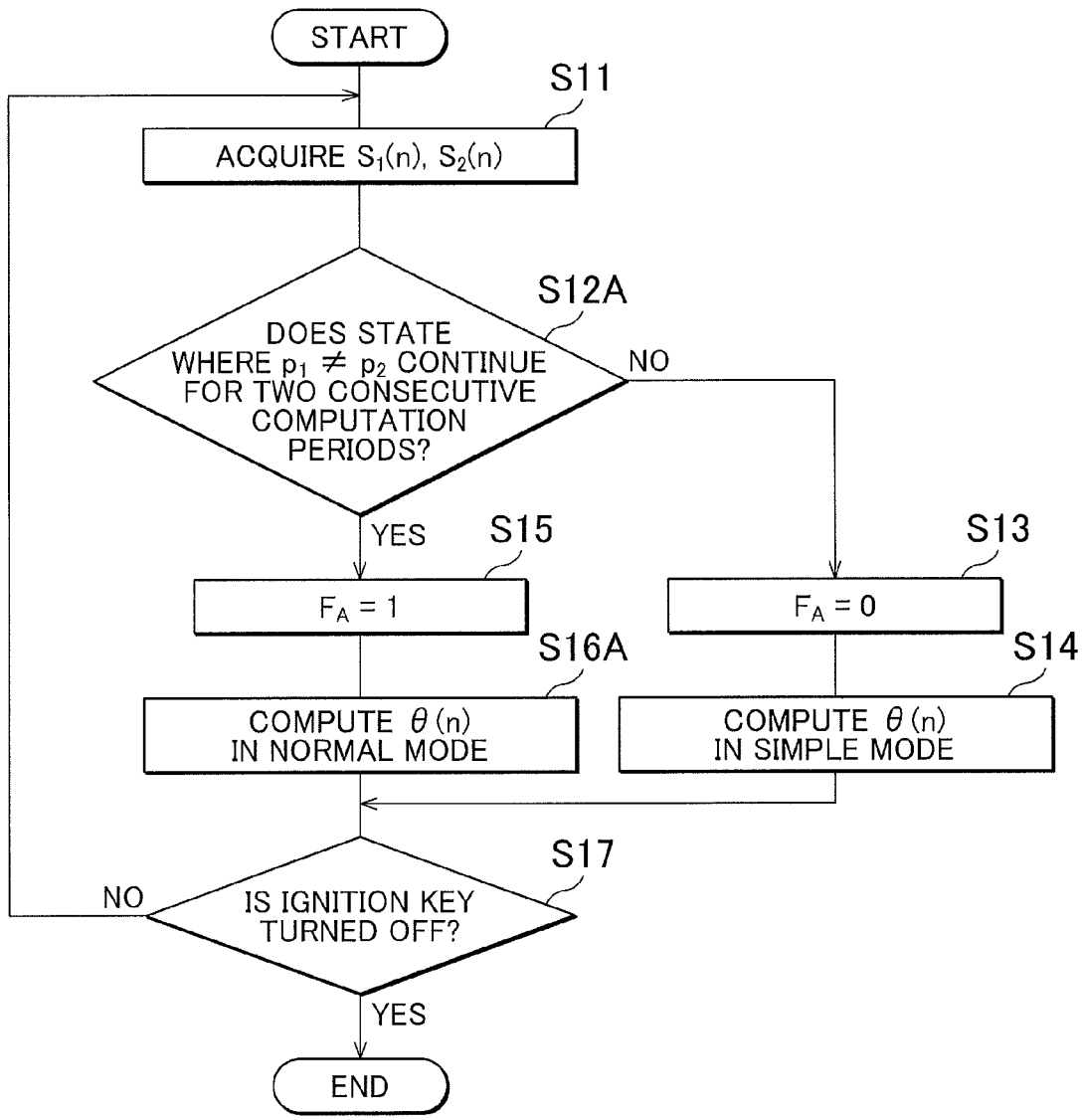
FIG. 8 is a flowchart showing another example of the operation of the first rotation angle computation unit in the case where the second computing method is employed in the normal mode.

FIG. 8 is a flowchart showing another example of the operation of the first rotation angle computation unit 77A in the case where the second computing method is employed in the normal mode. The process in FIG. 8 is similar to the process in FIG. 6. In FIG. 8, steps in which the same processes as those in steps in FIG. 6 are executed are denoted by the same reference symbols as those in FIG. 6. The process in FIG. 8 is the same as the process in FIG. 6 except that the processes in steps S12A, S16A in FIG. 8 differ from the processes in steps S12, S16 in FIG. 6. Therefore, only the processes in steps S12A, S16A will be described.

Because the second computing method is employed in the normal mode, in step S16A, the first rotation angle computation unit 77A computes the rotation angle θ(n) of the input shaft 8 according to the second computing method. In order to compute the rotation angle θ(n) of the input shaft 8 according to the second computing method in the case where the immediately preceding value of the rotation angle is not present, it is necessary to satisfy the condition that sensor values from each one of the magnetic sensors 71, 72, which are sampled at three sampling timings, are different from each other. In step S12A, the first rotation angle computation unit 77A determines whether the state where $p_1$ and $p_2$ are unequal to each other ($p_1 \neq p_2$) continues for two consecutive computation periods. That is, it is determined whether the condition that $p_1$ and $p_2$ are unequal to each other in the immediately preceding computation period and $p_1$ and $p_2$ are unequal to each other in the present computation period is satisfied.

If it is determined in step S12A that the state where $p_1 \neq p_2$ does not continue for two consecutive computation periods (NO in step S12A), the condition that the sensor values from each one of the magnetic sensors 71, 72, which are sampled at three sampling timings, differ from each other is not satisfied. Therefore, the first rotation angle computation unit 77A proceeds from step S13 on to step S14, and computes the rotation angle θ(n) of the input shaft 8 in the simple mode. On the other hand, if it is determined in step S12A that the state where $p_1 \neq p_2$ continues for two consecutive computation periods (YES in step S12A), the condition that the sensor values from each one of the magnetic sensors 71, 72, which are sampled at three sampling timings, differ from each other is satisfied. Therefore, the first rotation angle computation unit 77A proceeds from step S15 on to step S16A, and computes the rotation angle θ(n) of the input shaft 8 in the normal mode (the second computing method).

Figure 9:
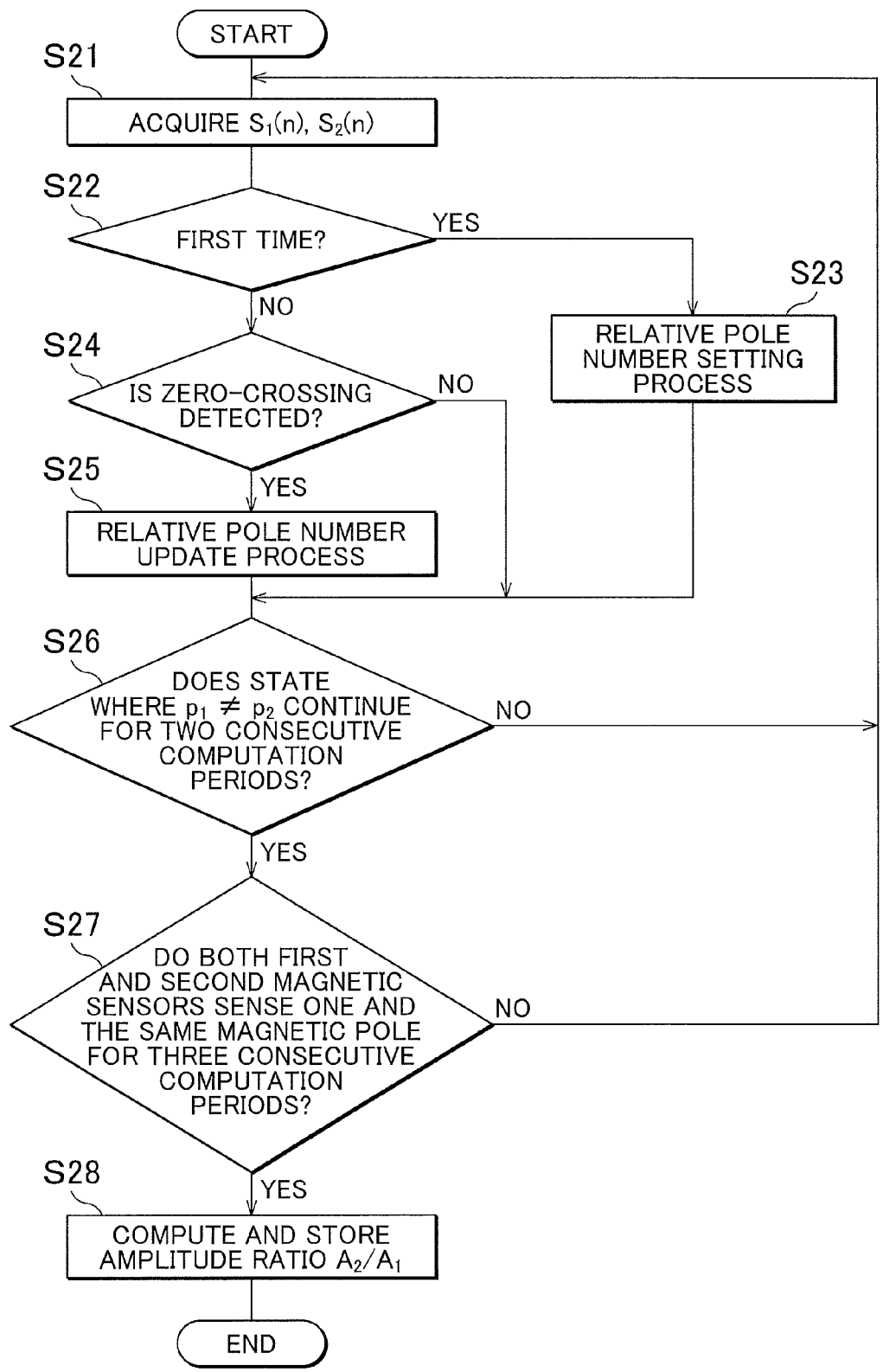
FIG. 9 is a flowchart showing the procedure of an amplitude ratio computing process.

Next, the operations of the first amplitude ratio computation unit 77D and the second amplitude ratio computation unit 77E will be described. Because the operation of the second amplitude ratio computation unit 77E is the same as the operation of the first amplitude ratio computation unit 77D, only the operation of the first amplitude ratio computation unit 77D will be described. FIG. 9 is a flowchart showing the procedure of an amplitude ratio computing process executed by the first amplitude ratio computation unit 77D. The amplitude ratio computing process is executed when the operation mode of the torque computation ECU 77 is set to the amplitude ratio computation mode by a specific operator or the like. After setting the operation mode of the torque computation ECU 77 to the amplitude ratio computation mode, the operator or the like manually rotates the steering wheel 2 during a prescribed period.

The numbers assigned to the magnetic poles, as relative numbers, using the magnetic pole sensed by the first magnetic sensor 71 at the start of the amplitude ratio computing process as a reference magnetic pole are defined as relative pole numbers. The relative pole number of a magnetic pole sensed by the first magnetic sensor 71 (hereinafter, referred to as "first relative pole number") is expressed by a variable r1, and the relative magnetic pole number of a magnetic pole sensed by the second magnetic sensor 72 (hereinafter, referred to as "second relative pole number") is expressed by a variable r2. Each of the relative pole numbers r1, r2 takes an integer from one to eight, the relative pole number that is smaller than one by one is eight, and the relative pole number that is greater than eight by one is one. In the present embodiment, when the magnetic pole (the reference magnetic pole) sensed by the first magnetic sensor 71 at the start of the amplitude ratio computing process is a north pole, a relative pole number of "1" is assigned to the magnetic pole. On the other hand, when the magnetic pole (the reference magnetic pole) sensed by the first magnetic sensor 71 at the start of the amplitude ratio computing process is a south pole, a relative pole number of "2" is assigned to the magnetic pole.

When the operation mode is set to the amplitude ratio computation mode, the first amplitude ratio computation unit 77D obtains the sensor values $S_1(n)$, $S_2(n)$ from the respective magnetic sensors 71, 72 (step S21). The process in step S21 is repeatedly executed with a predetermined computation period until the amplitude ratio $A_2/A_1$ is computed. A memory in the torque computation ECU 77 stores sensor values obtained at least at three timings. That is, the memory in the torque computation ECU 77 stores the sensor values from the sensor value obtained n-th preceding timing (n is a prescribed value) to the sensor value obtained most recently.

Figure 10:
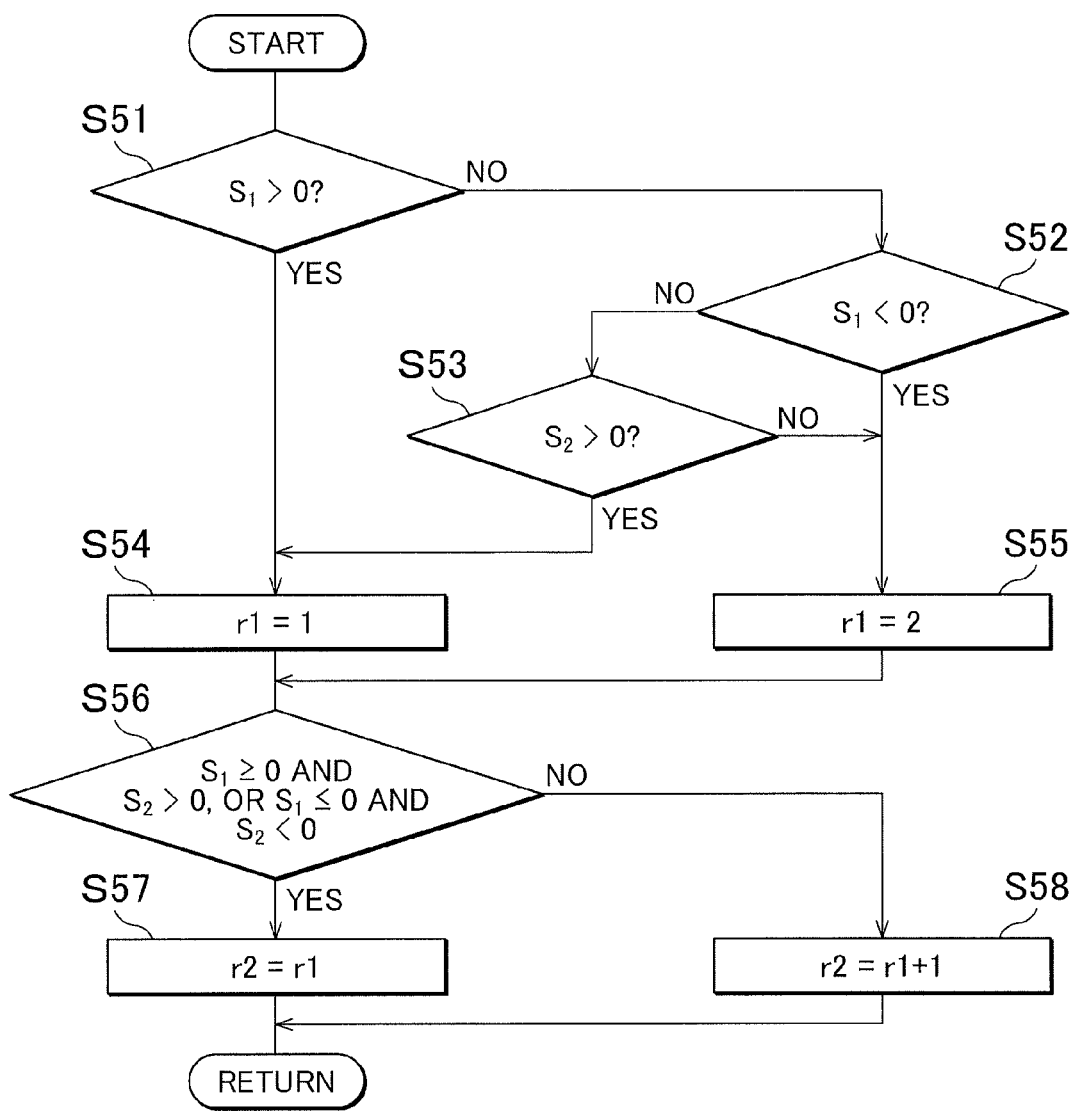
FIG. 10 is a flowchart showing the detailed procedure of a relative pole number setting process.

The first amplitude ratio computation unit 77D determines whether the present process is the first process after the start of the amplitude ratio computing process (step S22). If the present process is the first process after the start of the amplitude ratio computing process (YES in step S22), the first amplitude ratio computation unit 77D executes a relative pole number setting process (step S23). FIG. 10 is a flowchart showing the detailed procedure of the relative pole number setting process.

The first amplitude ratio computation unit 77D determines whether the first output signal $S_1$ is greater than zero (step S51). If the first output signal $S_1$ is greater than zero (YES in step S51), the first amplitude ratio computation unit 77D determines that the magnetic pole sensed by the first magnetic sensor 71 is the north pole, and sets the first relative pole number r1 to one (step S54). Then, the first amplitude ratio computation unit 77D proceeds on to step S56.

On the other hand, if the first output signal $S_1$ is equal to or smaller than zero (NO in step S51), the first amplitude ratio computation unit 77D determines whether the first output signal $S_1$ is smaller than zero (step S52). If the first output signal $S_1$ is smaller than zero (YES in step S52), the first amplitude ratio computation unit 77D determines that the magnetic pole sensed by the first magnetic sensor 71 is the south pole, and sets the first relative pole number r1 to two (step S55). Then, the first amplitude ratio computation unit 77D proceeds on to step S56.

If it is determined in step S52 that the first output signal $S_1$ is equal to or greater than zero (NO in step S52), that is, if the first output signal $S_1$ is zero, the first amplitude ratio computation unit 77D determines whether the second output signal $S_2$ is greater than zero in order to determine whether the rotation angle of the input shaft 8 is 0° or 180° (step S53). If the second output signal $S_2$ is greater than zero (YES in step S53), the first amplitude ratio computation unit 77D determines that the rotation angle of the input shaft 8 is 0°, and sets the first relative pole number r1 to one (step S54). Then, the first amplitude ratio computation unit 77D proceeds on to step S56.

On the other hand, if the second output signal $S_2$ is equal to or smaller than zero (NO in step S53), the first amplitude ratio computation unit 77D determines that the rotation angle of the input shaft 8 is 180°, and sets the first relative pole number r1 to two (step S55). Then, the first amplitude ratio computation unit 77D proceeds on to step S56. In step S56, the first amplitude ratio computation unit 77D determines whether the condition that "$S_1 \geq 0$ and $S_2 > 0$" or the condition that "$S_1 \geq 0$ and $S_2 < 0$" is satisfied. When one of the condition is satisfied (YES in step S56), the first amplitude ratio computation unit 77D determines that the pole number of the magnetic pole sensed by the second magnetic sensor 72 is the same as the pole number of the magnetic pole sensed by the first magnetic sensor 71, and sets the second relative pole number r2 to the same number (r2=r1) as the first relative pole number r1 (step S57). Then, the first amplitude ratio computation unit 77D proceeds on to step S26 in FIG. 9.

On the other hand, when none of the conditions in step S56 is satisfied (NO in step S56), the first amplitude ratio computation unit 77D determines that the pole number of the magnetic pole sensed by the second magnetic sensor 72 is greater by one than the pole number of the magnetic pole sensed by the first magnetic sensor 71, and sets the second relative pole number r2 to a number that is greater by one than the first relative pole number r1 (r2=r1+1) (step S58). Then, the first amplitude ratio computation unit 77D proceeds on to step S26 in FIG. 9.

Figure 11A:
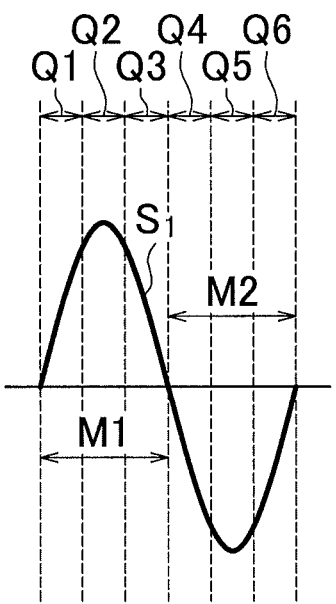
FIG. 11A is a schematic diagram illustrating the relative pole number setting process.
Figure 11B:
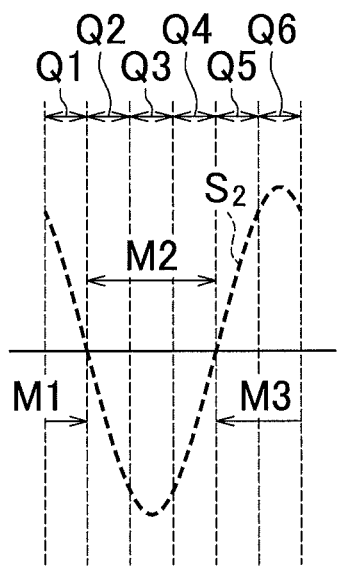
FIG. 11B is a schematic diagram illustrating the relative pole number setting process.

The reason why the second relative pole number r2 is determined on the basis of the conditions in step S56 will be described below. FIG. 11A and FIG. 11B schematically illustrate signal waveforms of the first and second output signals $S_1$, $S_2$ at the time when a magnetic pole pair constituted of, for example, the magnetic pole M1 and the magnetic pole M2 in the magnet 61 passes by the first magnetic sensor 71. In FIG. 11A and FIG. 11B, in regions indicated by Q1, Q4, the pole number of the magnetic pole sensed by the second magnetic sensor 72 is the same as the pole number of the magnetic pole sensed by the first magnetic sensor 71. On the other hand, in regions indicated by Q2, Q3, Q5, Q6, the pole number of the magnetic pole sensed by the second magnetic sensor 72 is greater by one than the pole number of the magnetic pole sensed by the first magnetic sensor 71.

In the region Q1, both the sensor values $S_1$, $S_2$ satisfy the first condition that $S_1 \geq 0$ and $S_2 > 0$. In the regions Q2, Q3, both the sensor values $S_1$, $S_2$ satisfy the second condition that $S_1 > 0$ and $S_2 \leq 0$. In the region Q4, both the sensor values $S_1$, $S_2$ satisfy the third condition that $S_1 \leq 0$ and $S_2 < 0$. In the regions Q5, Q6, both the sensor values $S_1$, $S_2$ satisfy the fourth condition that $S_1 < 0$ and $S_2 \geq 0$. When one of the first condition and the third condition is satisfied, the first amplitude ratio computation unit 77D determines that the pole number of the magnetic pole sensed by the second magnetic sensor 72 is the same as the pole number of the magnetic pole sensed by the first magnetic sensor 71. On the other hand, when neither the first condition nor the third condition is satisfied, the first amplitude ratio computation unit 77D determines that the pole number of the magnetic pole sensed by the second magnetic sensor 72 is greater by one than the pole number of the magnetic pole sensed by the first magnetic sensor 71.

As shown in FIG. 9, if it is determined in step S22 that the present process is not the first process after the start of the amplitude ratio computing process (NO in step S22), the first amplitude ratio computation unit 77D proceeds on to step S24. In step S24, the first amplitude ratio computation unit 77D determines whether zero-crossing of each of the sensor values $S_1$, $S_2$, that is, inversion of the sign of each of the sensor values $S_1$, $S_2$ is detected, on the basis of the sensor values $S_1$, $S_2$ stored in the memory. If zero-crossing is not detected (NO in step S24), the first amplitude ratio computation unit 77D proceeds on to step S26.

If zero-crossing of one of the sensor values $S_1$, $S_2$ is detected in step S24 (YES in step S24), the first amplitude ratio computation unit 77D executes a relative pole number updating process (step S25). Specifically, the first amplitude ratio computation unit 77D changes the relative pole number r1 or r2, which is presently set for the magnetic sensor that outputs the sensor value zero-crossing of which is detected in step S24, to a number that is greater by one or a number that is smaller by one than the presently set relative pole number r1 or r2, on the basis of the rotation direction of the input shaft 8 (the magnet 61).

When the rotation direction of the input shaft 8 is the forward direction (the direction indicated by the arrow in FIG. 3), the first amplitude ratio computation unit 77D updates the relative pole number r1 or r2, which is presently set for the magnetic sensor that outputs the sensor value zero-crossing of which is detected in step S24, to a number that is greater by one than the presently set relative pole number r1 or r2. On the other hand, when the rotation direction of the input shaft 8 is the reverse direction, the first amplitude ratio computation unit 77D updates the relative pole number r1 or r2, which is presently set for the magnetic sensor that outputs the sensor value zero-crossing of which is detected in step S24, to a number that is smaller by one than the presently set relative pole number r1 or r2. Note that, as described above, the relative pole number that is smaller than the relative pole number of "one" by one is "eight". Further, the relative pole number that is greater than the relative pole number "eight" by one is "one".

The rotation direction of the input shaft 8 can be determined on the basis of, for example, the immediately preceding value and the present value of the output signal zero-crossing of which is detected and the present value of the other output signal. Specifically, when the output signal zero-crossing of which is detected is the first output signal $S_1$, if the condition that "the immediately preceding value of the first output signal $S_1$ is greater than zero, the present value of the first output signal $S_1$ is equal to or smaller than zero, and the second output signal $S_2$ is smaller than zero" or the condition that "the immediately preceding value of the first output signal $S_1$ is smaller than zero, the present value of the first output signal $S_1$ is equal to or greater than zero, and the second output signal $S_2$ is greater than zero" is satisfied, it is determined that the rotation direction is the forward direction (the direction indicated by the arrow in FIG. 3).

If the condition that "the immediately preceding value of the first output signal $S_1$ is equal to or greater than zero, the present value of the first output signal $S_1$ is smaller than zero, and the second output signal $S_2$ is greater than zero" or the condition that "the immediately preceding value of the first output signal $S_1$ is equal to or smaller than zero, the present value of the first output signal $S_1$ is greater than zero, and the second output signal $S_2$ is smaller than zero" is satisfied, it is determined that the rotation direction is the reverse direction. When the output signal zero-crossing of which is detected is the second output signal $S_2$, if the condition that "the immediately preceding value of the second output signal $S_2$ is greater than zero, the present value of the second output signal $S_2$ is equal to or smaller than zero, and the first output signal $S_1$ is greater than zero" or the condition that "the immediately preceding value of the second output signal $S_2$ is smaller than zero, the present value of the second output signal $S_2$ is equal to or greater than zero, and the first output signal $S_1$ is smaller than zero" is satisfied, it is determined that the rotation direction is the forward direction (the direction indicated by the arrow in FIG. 3). On the other hand, if the condition that "the immediately preceding value of the second output signal $S_2$ is equal to or greater than zero, the present value of the second output signal $S_2$ is smaller than zero, and the first output signal $S_1$ is smaller than zero" or the condition that "the immediately preceding value of the second output signal $S_2$ is equal to or smaller than zero, the present value of the second output signal $S_2$ is greater than zero, and the first output signal $S_1$ is greater than zero" is satisfied, it is determined that the rotation direction is the reverse direction.

When the relative pole number update processing ends, the first amplitude ratio computation unit 77D proceeds on to step S26. In step S26, the first amplitude ratio computation unit 77D determines whether the state where $p_1$ and $p_2$ are unequal to each other ($p_1 \neq p_2$) continues for two consecutive computation periods. This is because the condition that the sensor values from each one of the magnetic sensors 71, 72, which are sampled at three sampling timings, differ from each other needs to be satisfied in order to compute the amplitude ratio $A_2/A_1$ according to the expression (42).

If it is determined in step S26 that the state where $p_1$ and $p_2$ are unequal to each other ($p_1 \neq p_2$) does not continue for two consecutive computation periods (NO in step S26), the first amplitude ratio computation unit 77D returns to step S21. If it is determined in step S26 that the state where $p_1$ and $p_2$ are unequal to each other ($p_1 \neq p_2$) continues for two consecutive computation periods (YES in step S26), the first amplitude ratio computation unit 77D determines whether the condition that the first and second magnetic sensors 71, 72 keep sensing one and the same magnetic pole for three consecutive computation periods (step S27) is satisfied. This is because the expression (42) used to compute the amplitude ratio $A_2/A_1$ is derived on the precondition that all the phase error correction values E contained in the sensor values from the magnetic sensors 71, 72, which are sampled at three sampling timings, are equal to each other. In each computation period, the relative numbers of the magnetic poles sensed by the magnetic sensors 71, 72 can be recognized with the use of the first relative magnetic pole number r1 and the second relative magnetic pole number r2, respectively. Therefore, if the relative magnetic pole numbers r1, r2 for multiple computation periods from the n-th preceding computation period (n is a prescribed value) to the present computation period are stored in the memory, the first amplitude ratio computation unit 77D can make the determination in step S27.

If the condition in step S27 is not satisfied (NO in step S27), the first amplitude ratio computation unit 77D returns to step S21. On the other hand, if the condition in step S27 is satisfied (YES in step S27), the first amplitude ratio computation unit 77D computes the amplitude ratio $A_2/A_1$ between the output signals from the magnetic sensors 71, 72 with the use of the sensor values from the magnetic sensors 71, 72, which are sampled at three sampling timings, and the expression (42), and stores the computed amplitude ratio $A_2/A_1$ in the nonvolatile memory (step S28). Then, the amplitude ratio computing process ends.

Figure 12:
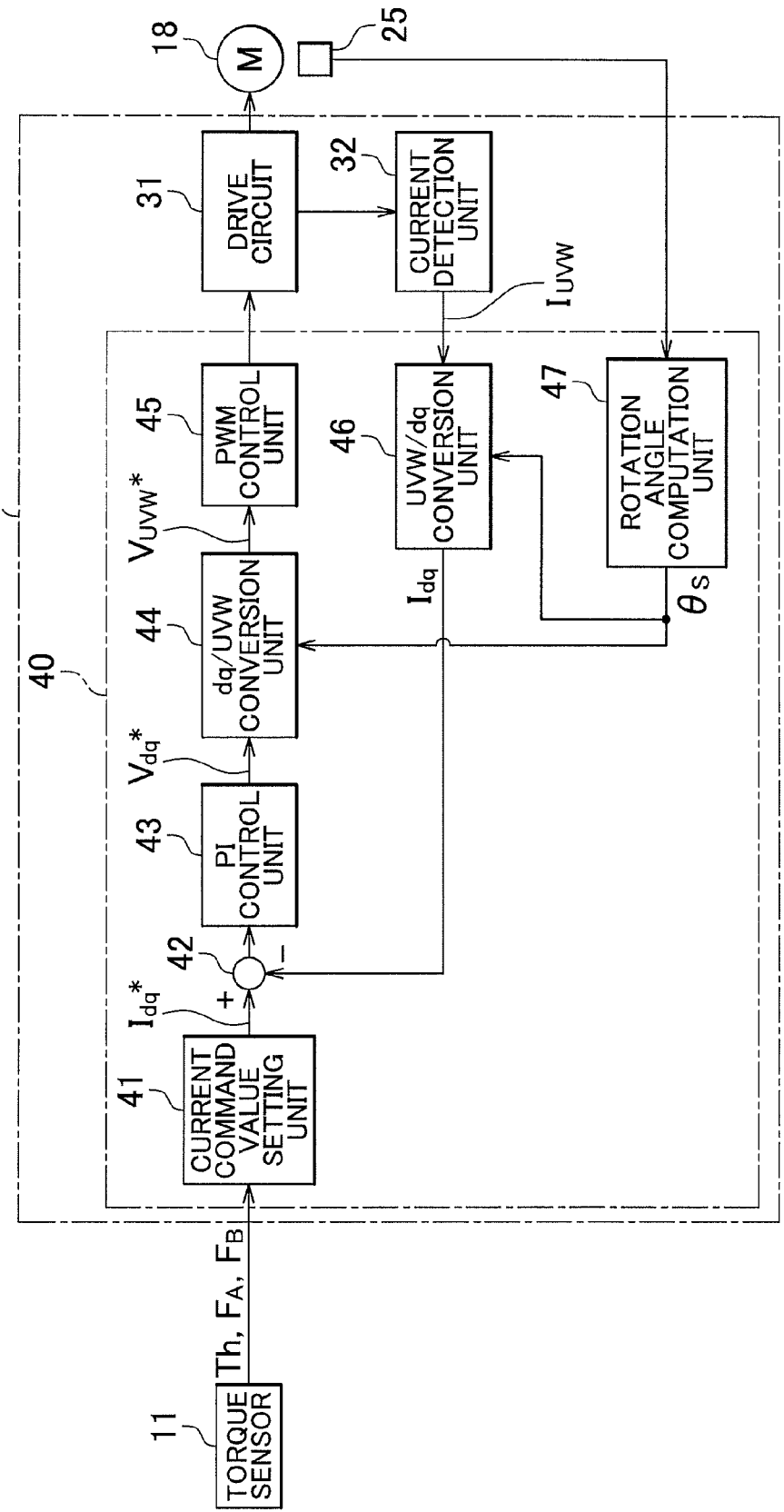
FIG. 12 is a schematic diagram illustrating the electrical configuration of a motor control ECU.

FIG. 12 is a schematic diagram illustrating the electrical configuration of the motor control ECU 12. The motor control ECU 12 (see FIG. 1) realizes appropriate steering assistance suited to a steering state, by driving the electric motor 18 on the basis of the steering torque Th provided from the torque sensor 11 and the mode flags $F_A$, $F_B$. The motor control ECU 12 includes a microcomputer 40, a drive circuit (inverter circuit) 31 that is controlled by the microcomputer 40 and that supplies electric power to the electric motor 18, and a current detection unit 32 that detects a motor current passing through the electric motor 18.

Figure 13:
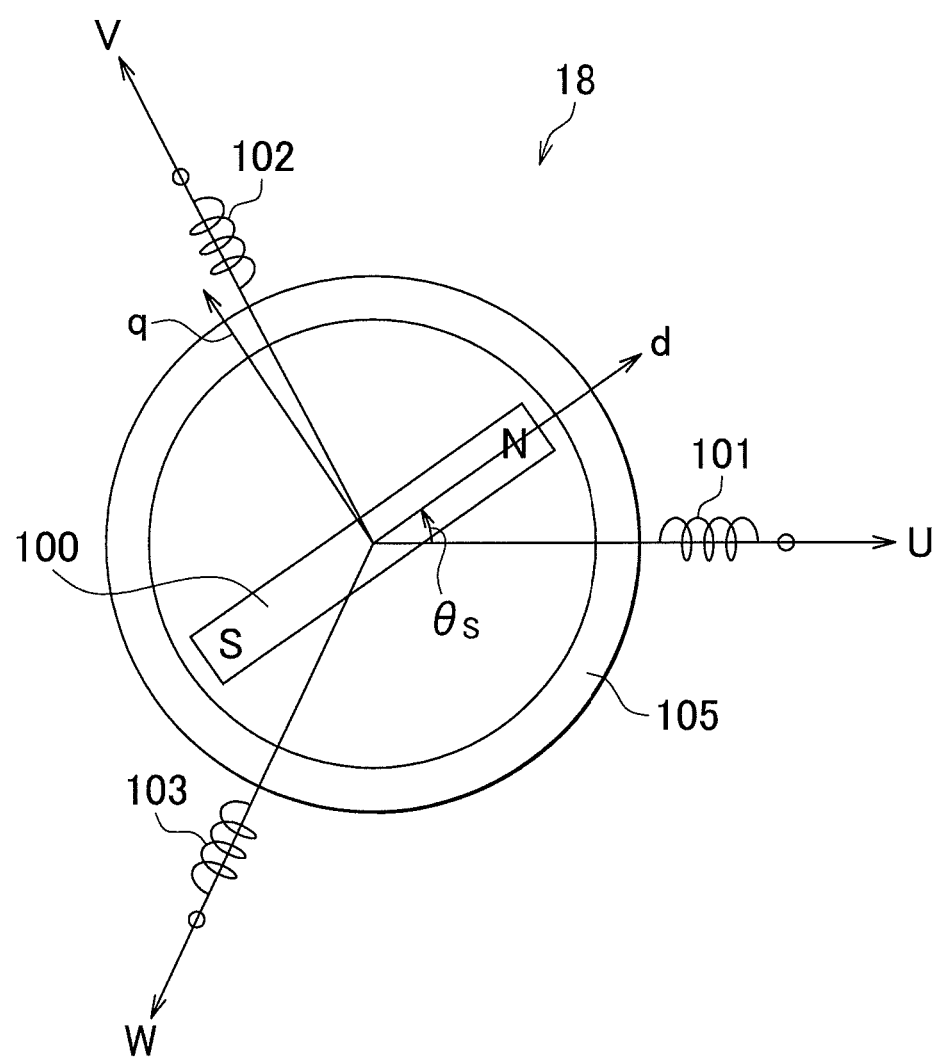
FIG. 13 is a schematic diagram schematically illustrating the configuration of an electric motor.

The electric motor 18 is, for example, a three-phase brushless motor, and includes a rotor 100, which serves as a field magnet, and a stator 105 provided with U-phase, V-phase, and W-phase stator coils 101, 102, 103, as schematically illustrated in FIG. 13. The electric motor 18 may be an electric motor of an inner rotor type, in which a stator is arranged outside a rotor so as to face the rotor, or may be an electric motor of an outer rotor type, in which a stator is arranged inside a tubular rotor so as to face the rotor.

A three-phase fixed coordinate system (a UVW coordinate system) is defined, in which a U-axis, a V-axis, and a W-axis are set to the respective directions of the U-phase stator coil 101, the V-phase stator coil 102 and the W-phase stator coil 13. A two-phase rotating coordinate system (a dq coordinate system: an actual rotating coordinate system) is defined, in which a d-axis (a magnetic pole axis) is set to the magnetic pole direction of the rotor 100 and a q-axis (a torque axis) is set to the direction orthogonal to the d-axis within a rotary plane of the rotor 100. The dq coordinate system is a rotating coordinate system that rotates together with the rotor 100. In the dq coordinate system, because only a q-axis current contributes to generation of torque of the rotor 100, a d-axis current is set to zero and the q-axis current is controlled on the basis of a desired torque. A rotation angle (electrical angle) θ-S of the rotor 100 is a rotation angle of the d-axis with respect to the U-axis. The dq coordinate system is an actual rotating coordinate system that rotates in accordance with the rotor angle θ-S. With the use of the rotor angle θ-S, coordinate conversion between the UVW coordinate system and the dq coordinate system can be executed.

The microcomputer 40 includes a CPU and memories (a ROM, a RAM, a non-volatile memory, etc.), and is configured to function as a plurality of functional processing units by executing predetermined programs. The functional processing units include a current command value setting unit 41, a current deviation computation unit 42, a PI (Proportional Integral) control unit 43, a dq/UVW conversion unit 44, a PWM (Pulse Width Modulation) control unit 45, a UVW/dq conversion unit 46, and a rotation angle computation unit 47.

The rotation angle computation unit 47 computes a rotor rotation angle (electrical angle) (hereinafter, referred to as "rotor angle $\theta_S$") of the electric motor 18 on the basis of a signal output from the rotation angle sensor 25. The current command value setting unit 41 sets current values, which are values of currents that should be passed through coordinate axes of the dq coordinate system, as current command values. Specifically, the current command value setting unit 41 sets a d-axis current command value $I_{d*}$ and a q-axis current command value $I_{q*}$ (hereinafter, the d-axis current command value $I_{d*}$ and the q-axis current command value $I_{q*}$ will be collectively referred to as "two-phase current command values $I_{dq*}$" where appropriate). More specifically, the current command value setting unit 41 sets the q-axis current command value $I_{q*}$ to a significant value, whereas it sets the d-axis current command value $I_{d*}$ to zero. More specifically, the current command value setting unit 41 sets the q-axis current command value $I_{q*}$ on the basis of the steering torque (detected steering torque) Th provided by the torque sensor 11 and the mode flags $F_A$, $F_B$.

The mode flag $F_A$ is set to one ($F_A=1$) when the rotation angle $\theta_A$ of the input shaft 8 used to compute the steering torque Th is computed in the normal mode, and set to zero ($F_A=0$) when the rotation angle $\theta_A$ of the input shaft 8 is computed in the simple mode. The mode flag $F_B$ is set to one ($F_B=1$) when the rotation angle $\theta_B$ of the input shaft 8 used to compute the steering torque Th is computed in the normal mode, and set to zero ($F_B=0$) when the rotation angle $\theta_B$ of the input shaft 8 is computed in the simple mode.

Figure 14A:
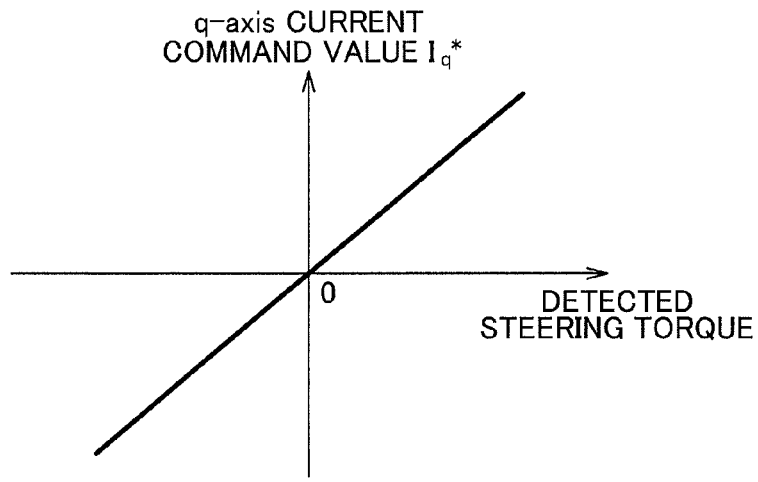
FIG. 14A is a graph illustrating an example of a manner of setting a q-axis current command value $I_{q*}$ with respect to a detected steering torque Th.

Hereinafter, a method of setting the q-axis current command value $I_{q*}$ when values of both the mode flag $F_A$, $F_B$ are one will be described. An example of a manner of setting the q-axis current command value $I_{q*}$ with respect to the detected steering torque Th is shown in FIG. 14A. With regard to the detected steering torque Th, for example, a torque for steering to the right takes a positive value, and a torque for steering to the left takes a negative value. The q-axis current command value $I_{q*}$ takes a positive value when an operation assist force for steering to the right should be generated by the electric motor 18, and takes a negative value when an operation assist force for steering to the left should be generated by the electric motor 18. The q-axis current command value $I_{q*}$ with respect to a positive value of the detected steering torque Th takes a positive value, and the q-axis current command value $I_{q*}$ with respect to a negative value of the detected steering torque Th takes a negative value. When the detected steering torque Th is zero, the q-axis current command value $I_{q*}$ is zero. The q-axis current command value $I_{q*}$ is set such that the absolute value of the q-axis current command value $I_{q*}$ increases as the absolute value of the detected steering torque Th increases.

A method of setting the q-axis current command value $I_{q*}$ when the values of both the mode flags $F_A$, $F_B$ are zero will be described. An estimated maximum error of the rotation angle $\theta_A$ when the rotation angle $\theta_A$ of the input shaft 8 is computed in the simple mode is $\epsilon_A$, and an estimated maximum error of the rotation angle $\theta_B$ when the rotation angle $\theta_B$ of the output shaft 9 is computed in the simple mode is $\epsilon_B$. The maximum error $\epsilon_A$ and the maximum error $\epsilon_B$ are assumed to be equal to each other and denoted by $\epsilon$ ($\epsilon_A=\epsilon_B=\epsilon$). On the assumption that the maximum errors is produced in each of the rotation angles $\theta_A$, $\theta_B$ of the input shaft 8 and the output shaft 9 used to compute the steering torque Th, a magnitude of an error in the detected steering torque (an estimated maximum torque error) caused due to the maximum error $\epsilon$ is Th1 ($>0$). The magnitude of the estimated maximum torque error Th1 is obtained by computation in advance.

Figure 14B:
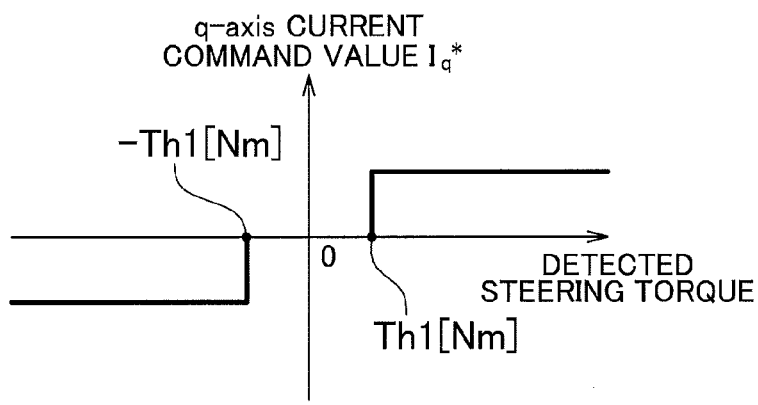
FIG. 14B is a graph illustrating an example of a manner of setting the q-axis current command value $I_{q*}$ with respect to the detected steering torque Th.

FIG. 14B shows an example of a manner of setting the q-axis current command value $I_{q*}$ with respect to the detected steering torque Th when values of the mode flags $F_A$, $F_B$ are both zero. In a region where the absolute value of the detected steering torque Th is equal to or smaller than the estimated maximum torque error Th1, a dead zone where the q-axis current command value $I_{q*}$ is zero is set. In a region where the detected steering torque Th is greater than Th1, the q-axis current command value $I_{q*}$ is set to a fixed positive value. In a region where the detected steering torque Th is smaller than −Th1, the q-axis current command value $I_{q*}$ is set to a fixed negative value.

Figure 14C:
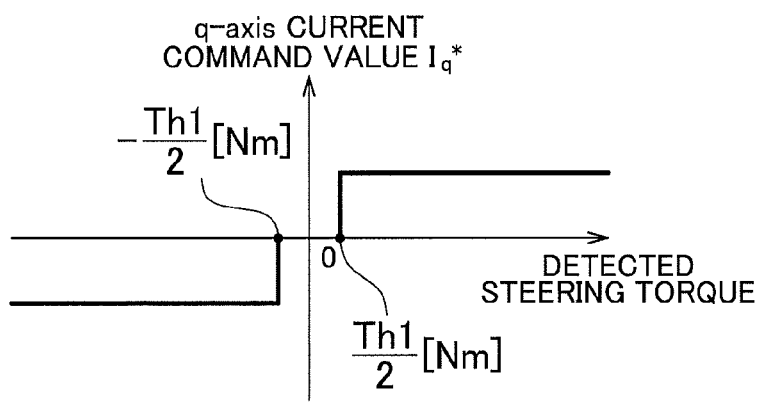
FIG. 14C is a graph illustrating an example of a manner of setting the q-axis current command value $I_{q*}$ with respect to the detected steering torque Th.
Figure 15:
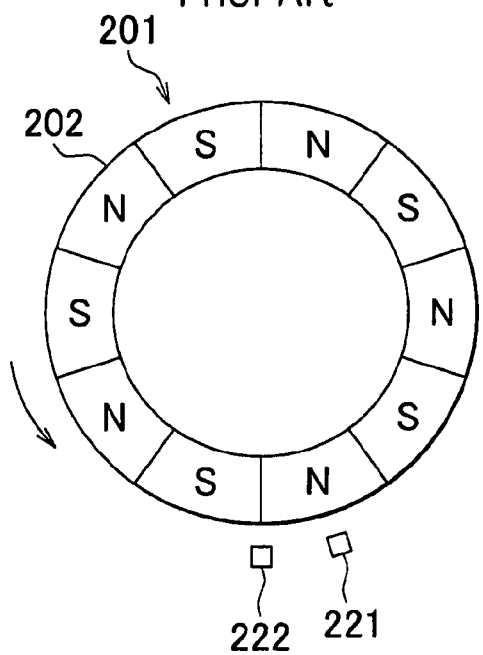
FIG. 15 is a schematic diagram illustrating a rotation angle detection method executed by a conventional rotation angle detection device.
Figure 16:
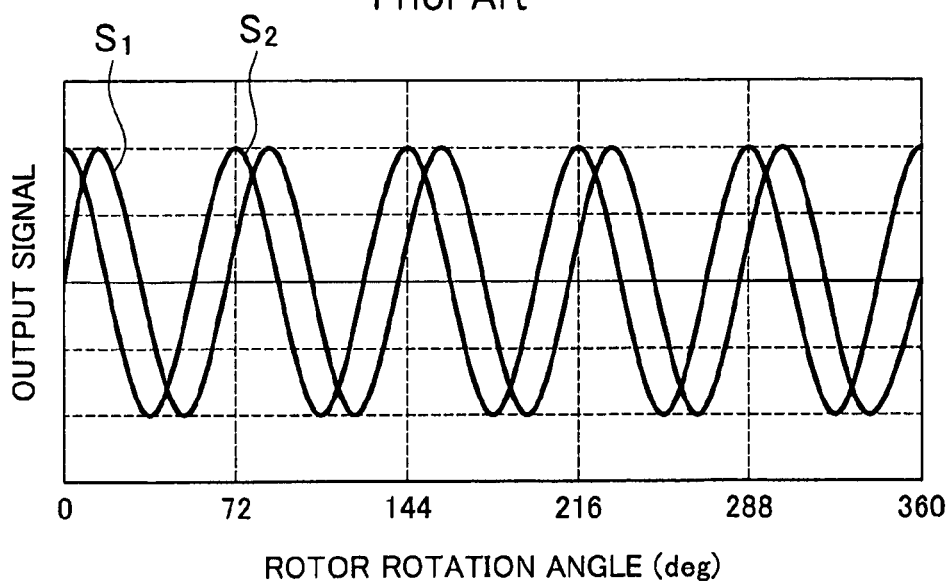
FIG. 16 is a schematic diagram illustrating waveforms of output signals from a first magnetic sensor and a second magnetic sensor.

Thus, even if an error is produced in the steering torque Th by computing both the rotation angle $\theta_A$ of the input shaft 8 and the rotation angle $\theta_B$ of the output shaft 9 in the simple mode, it is possible to prevent the steering assist torque in a direction opposite to the direction of the steering assist torque that should be generated, from being generated by the electric motor 18. Next, a method of setting the q-axis current command value $I_{q*}$ when one of the mode flags $F_A$, $F_B$ is set to zero and the other one of the mode flags $F_A$, $F_B$ is set to one will be described. In this case, because only one of the rotation angle $\theta_A$ of the input shaft 8 and the rotation angle $\theta_B$ of the output shaft is computed in the simple mode, the estimated maximum error of the detected steering torque is ½ of the estimated maximum torque error Th1. Therefore, an example of a manner of setting the q-axis current command value $I_{q*}$ with respect to the detected steering torque Th in this case is as shown in FIG. 14C. In a region where the absolute value of the detected steering torque Th is equal to or smaller than ½ of the estimated maximum torque error Th1, a dead zone where the q-axis current command value $I_{q*}$ is zero is set. In a region where the detected steering torque Th is greater than Th½, the q-axis current command value $I_{q*}$ is set to a fixed positive value. In a region where the detected steering torque Th is smaller than −Th½, the q-axis current command value $I_{q*}$ is set to a fixed negative value.

Thus, even if an error is produced in the steering torque Th by computing one of the rotation angle $\theta_A$ of the input shaft 8 and the rotation angle $\theta_B$ of the output shaft 9 in the simple mode, it is possible to prevent the steering assist torque in a direction opposite to the direction of the steering assist torque that should be generated, from being generated by the electric motor 18. The two-phase current command values $I_{dq*}$ set by the current command value setting unit 41 are provided to the current deviation computation unit 42.

The current detection unit 32 detects a U-phase current $I_U$, a V-phase current $I_V$, and a W-phase current $I_W$ for the electric motor 18 (hereinafter, the U-phase current $I_U$, the V-phase current $I_V$, and the W-phase current $I_W$ will be collectively referred to as "three-phase detected currents $I_{UVW}$" where appropriate). The three-phase detected currents $I_{UVW}$ detected by the current detection unit 32 are provided to the UVW/dq conversion unit 46. The UVW/dq conversion unit 46 executes coordinate conversion from the three-phase detected currents $I_{UVW}$ (the U-phase current $I_U$, the V-phase current $I_V$, and the W-phase current $I_W$) of the UVW coordinate system detected by the current detection unit 32, into two-phase detected currents $I_d$, $I_q$ of the dq coordinate system (hereinafter, the two-phase detected currents $I_d$, $I_q$ will be collectively referred to as "two-phase detected currents $I_{dq}$" where appropriate). The rotor angle $\theta_S$ computed by the rotation angle computation unit 47 is used for this coordinate conversion.

The current deviation computation unit 42 computes deviations between the two-phase current command values $I_{dq*}$ set by the current command value setting unit 41 and the two-phase detected currents $I_{dq}$ provided from the UVW/dq conversion unit 46. Specifically, the current deviation computation unit 42 computes a deviation of the d-axis detected current $I_d$ with respect to the d-axis current command value $I_{d*}$ and a deviation of the q-axis detected current $I_q$ with respect to the q-axis current command value $I_{q*}$. These deviations are provided to the PI control unit 43.

The PI control unit 43 generates two-phase voltage command values $V_{dq*}$ (the d-axis voltage command value $V_{d*}$ and the q-axis voltage command value $V_{q*}$), which are values of voltages that should be applied to the electric motor 18, by executing a PI computation on the current deviations computed by the current deviation computation unit 42. The two-phase voltage command values $V_{dq*}$ are provided to the dq/UVW conversion unit 44. The dq/UVW conversion unit 44 executes coordinate conversion from the two-phase voltage command values $V_{dq*}$ into three-phase voltage command values $V_{UVW*}$. The rotor angle $\theta_S$ computed by the rotation angle computation unit 47 is used for this coordinate conversion. The three-phase voltage command values $V_{UVW*}$ consist of a U-phase voltage command value $V_{U*}$, a V-phase voltage command value $V_{V*}$, and a W-phase voltage command value $V_{W*}$. The three-phase voltage command values $V_{UVW*}$ are provided to the PWM control unit 45.

The PWM control unit 45 generates a U-phase PWM control signal, a V-phase PWM control signal, and a W-phase PWM control signal having duty ratios corresponding to the U-phase voltage command value $V_{U*}$, the V-phase voltage command value $V_{V*}$, and the W-phase voltage command value $V_{W*}$, respectively, and provides these control signals to the drive circuit 31. The drive circuit 31 is formed of an inverter circuit with three phases corresponding to the U-phase, the V-phase, and the W-phase. When power elements constituting the inverter circuit are controlled by the PWM control signals provided from the PWM control unit 45, voltages corresponding to the three-phase voltage command values $V_{UVW*}$ are applied to the U-phase stator coil 101, the V-phase stator coil 102 and the W-phase stator coil 103 of the electric motor 18.

The current deviation computation unit 42 and the PI control unit 43 constitute a current feedback controller. Due to the action of the current feedback controller, motor currents passing through the electric motor 18 are controlled so as to approach the two-phase current command values $I_{dq*}$ set by the current command value setting unit 41. Note that, the invention may be implemented in various other modified embodiments within the scope of the appended claims.

What is claimed is:

1. A rotation angle detection device comprising:
a plurality of sensors used to detect a rotation angle of a rotary body;
a first rotation angle computation unit that computes the rotation angle of the rotary body with use of a first plurality of output signals from a first set of two sensors among the plurality of the sensors, and samples the first plurality of output signals at a prescribed number of different timings, the prescribed number being two or more;
a second rotation angle computation unit that computes the rotation angle of the rotary body with use of a second plurality of output signals from a second set of two sensors among the plurality of the sensors, and samples the second plurality of output signals at one sampling timing; and
a selector that selects one of the first rotation angle computation unit and the second rotation angle computation unit, as a computation unit used to compute the rotation angle of the rotary body, based on the first plurality of output signals from the first set of two sensors when the selector selects the first rotational angle computation unit and based on the second plurality of output signals from the second set of two sensors when the selector selects the second rotational angle computation unit.

2. The rotation angle detection device according to claim 1, wherein the selector is configured such that the first rotation angle computation unit computes the rotation angle of the rotary body after a power supply is turned on, and
the selector selects the second rotation angle computation unit as the computation unit used to compute the rotation angle of the rotary body until a condition is satisfied that the first plurality of output signals from each one of the sensors of the first set of two sensors differ from each other, and selects the first rotation angle computation unit to compute the rotation angle of the rotary body when the condition is satisfied and after the condition is satisfied.

3. The rotation angle detection device according to claim 1, wherein the selector is configured such that the selector selects the first rotation angle computation unit as the computation unit used to compute the rotation angle of the rotary body when a condition is satisfied that the first plurality of output signals from each one of the sensors of the first set of two sensors differ from each other, and selects the second rotation angle computation unit as the computation unit used to compute the rotation angle of the rotary body when the condition is not satisfied.

4. The rotation angle detection device according to claim 1, wherein:
a condition is satisfied that the number of multiple expressions obtained by operating each of the first plurality of the output signals used by the first rotation angle computation unit to compute the rotation angle of the rotary body is smaller than the number of unknown quantities included in the multiple expressions; and
the first rotation angle computation unit is configured to compute the rotation angle of the rotary body by solving simultaneous equations constituted of the multiple expressions after setting the number of unknown quantities included in the multiple expression equal to or smaller than the number of multiple expressions obtained by operating each of the first plurality of output signals used by the first rotation angle computation unit to compute the rotation angle of the rotary body by setting predetermined unknown quantities among the unknown quantities included in the multiple expressions to be equal to each other.

5. The rotation angle detection device according to claim 4, further comprising:
a multipolar magnet that rotates in accordance with rotation of the rotary body, and that has a plurality of magnetic poles, wherein
the plurality of the sensors is a plurality of magnetic sensors that respectively output sinusoidal signals having a predetermined phase difference in accordance with rotation of the multipolar magnet, the first rotation angle computation unit is configured to compute the rotation angle of the rotary body with use of four output signals from the first plurality of the output signals being sampled at a prescribed number of different timings from the first set of two sensors among the plurality of the sensors, the four output signals being sampled at two different timings, the multiple expressions are constituted of four expressions obtained by operating the four output signals, each of the expressions including an amplitude and the rotation angle of the rotary body as the unknown quantities, and the first rotation angle computation unit sets the number of unknown quantities included in the multiple expressions equal to or smaller than the number of multiple expressions obtained by operating each of the first plurality of output signals used by the first rotation angle computation unit to compute the rotation angle of the rotary body, by setting, among the unknown quantities included in the four expressions, the amplitudes of two output signals of the first plurality of output signals from each one of the two sensors of the first set of two sensors, sampled at different sampling timings, equal to each other.

6. The rotation angle detection device according to claim 5, wherein the second rotation angle computation unit is configured to compute the rotation angle of the rotary body with use of the second plurality of output signals being sampled at one sampling timing from the second set of two sensors among the plurality of sensors, the second plurality of output signals being sampled at the one sampling timing, and an amplitude ratio between the second plurality of output signals from the second set of two sensors, the amplitude ratio being set in advance.

7. The rotation angle detection device according to claim 4, further comprising a multipolar magnet that rotates in accordance with rotation of the rotary body, and that has a plurality of magnetic poles, wherein the plurality of the sensors is a plurality of magnetic sensors that respectively output sinusoidal signals having a predetermined phase difference in accordance with rotation of the multipolar magnet, the first rotation angle computation unit is configured to compute the rotation angle of the rotary body with use of six output signals from the first plurality of the output signals being sampled at a prescribed number of different timings from the first set of two sensors among the plurality of the sensors, the six output signals being sampled at three different timings, the multiple expressions are constituted of six expressions obtained by operating the six output signals, each of the expressions including an amplitude, the rotation angle of the rotary body, and a piece of information regarding a magnetic pole width of each of the magnetic poles of the multipolar magnet as the unknown quantities, and the first rotation angle computation unit sets the number of unknown quantities included in the multiple expressions equal to or smaller than the number of multiple expressions obtained by operating each of the first plurality of output signals used by the first rotation angle computation unit to compute the rotation angle of the rotary body, by setting, among the unknown quantities included in the six expressions, the amplitudes of three output signals of the first plurality of output signals from each one of the two sensors of the first set of two sensors, sampled at different sampling timings, equal to each other, and all the pieces of the information regarding the magnetic pole width included in the six expressions are the same.

8. An electric power steering system comprising:
a plurality of sensors used to detect a rotation angle of a rotary body;
a sampling unit that samples an output signal from each of the sensors at a prescribed timing;
a first rotation angle computation unit that computes the rotation angle of the rotary body with use of a first plurality of the output signals from a first set of at least two sensors among the plurality of the sensors, and samples the first plurality of output signals at a prescribed number of different timings, the prescribed number being two or more;
a second rotation angle computation unit that computes the rotation angle of the rotary body with use of a second plurality of output signals from a second set of two sensors among the plurality of the sensors, and samples the output signals at one sampling timing;
a first rotation angle detection device that includes the first rotation angle computation unit and the second rotation angle computation unit;
a second rotation angle detection device that includes the first rotation angle computation unit and the second rotation angle computation unit;
a steering shaft including an input shaft, an output shaft, and a torsion bar that connects the input shaft and the output shaft to each other;
an electric motor used to generate steering assist force;
the first rotation angle detection device being configured to detect a rotation angle of the input shaft as a first rotation angle; and
the second rotation angle detection device being configured to detect a rotation angle of the output shaft as a second rotation angle;
a steering torque computation unit that computes a steering torque that is supplied to the input shaft, based on the first rotation angle detected by the first rotation angle detection device and the second rotation angle detected by the second rotation angle detection device; and
a current command value setting unit that sets a current command value that serves as a target value of a current to be passed through the electric motor, with use of the steering torque computed by the steering torque computation unit,
wherein the current command value setting unit includes a dead zone setting unit that sets the current command value to zero when at least one of the first rotation angle and the second rotation angle used to compute the steering torque is computed by the second rotation angle computation unit of at least one of the first rotation angle detection device and the second rotation angle detection device and an absolute value of the steering torque is equal to or smaller than a prescribed value.

9. The electric power steering system according to claim 8, wherein
the dead zone setting unit includes:
a device that sets the current command value to zero when both the first rotation angle and the second rotation angle used to compute the steering torque are computed by the second rotation angle computation unit and the absolute value of the steering torque is equal to or smaller than a first prescribed value; and a device that sets the current command value to zero when only one of the first rotation angle and the second rotation angle used to compute the steering torque is computed by the second rotation angle computation unit and the absolute value of the steering torque is equal to or smaller than a second prescribed value that is smaller than the first prescribed value.

* * * * *